(12) United States Patent
Yamada et al.

(10) Patent No.: US 8,562,404 B2
(45) Date of Patent: Oct. 22, 2013

(54) COMPUTER DEVICE FOR IMPLEMENTING A TRADING CARD GAME AND CONTROL METHOD THEREFOR, PROGRAM EXECUTED BY COMPUTER DEVICE, CONTROLLER, SYSTEM, AND GAME CARDS

(75) Inventors: Akitoshi Yamada, Kanagawa (JP); Hirokazu Uchio, Tokyo (JP); Kenji Takahashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 12/166,297

(22) Filed: Jul. 1, 2008

(65) Prior Publication Data
US 2008/0274780 A1 Nov. 6, 2008

Related U.S. Application Data

(63) Continuation of application No. 10/161,666, filed on Jun. 5, 2002, now abandoned.

(30) Foreign Application Priority Data

| | | |
|---|---|---|
| Jun. 18, 2001 | (JP) | 2001-183372 |
| Aug. 22, 2001 | (JP) | 2001-251347 |
| Aug. 22, 2001 | (JP) | 2001-251348 |
| Aug. 22, 2001 | (JP) | 2001-251349 |

(51) Int. Cl.
*A63F 1/00* (2006.01)
*A63F 13/00* (2006.01)

(52) U.S. Cl.
USPC .................. 463/11; 463/9; 463/42; 273/308; 273/148 R

(58) Field of Classification Search
USPC ......... 463/25, 29, 43, 11, 47; 273/308, 148 R
See application file for complete search history.

(56) References Cited

U.S. PATENT DOCUMENTS

| | | | |
|---|---|---|---|
| 1,557,284 A | | 10/1925 | Horowitz |
| 5,026,058 A | | 6/1991 | Bromley |
| 5,255,915 A | | 10/1993 | Miller |
| 5,358,259 A | * | 10/1994 | Best ............................... 463/31 |
| 5,393,964 A | | 2/1995 | Hamilton et al. |
| 5,408,469 A | | 4/1995 | Opher et al. |
| 5,411,259 A | | 5/1995 | Pearson et al. |
| 5,414,457 A | | 5/1995 | Kadowaki et al. |
| 5,533,124 A | | 7/1996 | Smith et al. |
| 5,557,483 A | | 9/1996 | Takahashi |
| 5,689,561 A | | 11/1997 | Pace |
| 5,961,386 A | | 10/1999 | Sawaguchi |
| 6,061,656 A | | 5/2000 | Pace |

(Continued)

FOREIGN PATENT DOCUMENTS

| | | |
|---|---|---|
| CH | 1158458 | 9/1997 |
| JP | 5-49755 | 3/1993 |

(Continued)

*Primary Examiner* — Dmitry Suhol
*Assistant Examiner* — Andrew Kim
(74) *Attorney, Agent, or Firm* — Fitzpatrick, Cella, Harper & Scinto

(57) ABSTRACT

A card game program is executed in a computer device for playing a game using a plurality of cards. The identification information of each card is used to generate a combination of the cards for a game player. The combination of the cards is changed in response to an instruction of the game player.

12 Claims, 20 Drawing Sheets

(56) References Cited

U.S. PATENT DOCUMENTS

| | | | |
|---|---|---|---|
| 6,199,065 B1 * | 3/2001 | Kenyon | 1/1 |
| 6,200,216 B1 | 3/2001 | Peppel | |
| 6,385,177 B1 | 5/2002 | Suda et al. | |
| 6,549,573 B2 | 4/2003 | Takahashi | |
| 6,581,831 B2 | 6/2003 | Madani | |
| 6,612,501 B1 | 9/2003 | Woll et al. | |
| 6,654,700 B2 | 11/2003 | Takahashi | |
| 6,663,492 B2 | 12/2003 | Thompson et al. | |
| 6,813,436 B1 * | 11/2004 | Hirai | 386/252 |
| 7,218,675 B1 | 5/2007 | Takahashi | |
| 7,314,407 B1 * | 1/2008 | Pearson | 463/7 |
| 2001/0039206 A1 | 11/2001 | Peppel | |
| 2002/0052238 A1 | 5/2002 | Muroi | 463/40 |
| 2003/0037075 A1 * | 2/2003 | Hannigan et al. | 707/500 |
| 2003/0171142 A1 | 9/2003 | Kaji et al. | |

FOREIGN PATENT DOCUMENTS

| | | |
|---|---|---|
| JP | 5-307634 | 11/1993 |
| JP | 6-304292 | 11/1994 |
| JP | 3008839 | 3/1995 |
| JP | 7-204314 | 8/1995 |
| JP | 7-325786 | 12/1995 |
| JP | 11-99285 | 4/1999 |
| JP | 11-244537 | 9/1999 |
| JP | 2001-170366 | 6/2001 |
| JP | 2002-336399 | 11/2002 |
| JP | 2003-230768 | 8/2003 |
| WO | 97/13558 | 4/1997 |
| WO | 02/062440 | 8/2002 |

* cited by examiner

FIG. 7

| IDENTIFICATION INFORMATION | NAME | ATTRIBUTE | STRENGTH | OFFENSIVE POWER | DEFENSIVE POWER |
|---|---|---|---|---|---|
| A00001 | XXXXX | ○ | 100 | 21000 | 40 |
| B00010 | XXXXX | △ | 20000 | 50000 | 60000 |
| D00100 | XXXXX | ○ | 5 | 1000 | 10 |
| C00020 | XXXXX | × | 4000 | 7000 | 500 |
| D00025 | XXXXX | □ | 600 | 30 | 800 |
| ⋯ | ⋯ | ⋯ | ⋯ | ⋯ | ⋯ |

| IDENTIFICATION INFORMATION | NAME | ATTRIBUTE | STRENGTH | OFFENSIVE POWER | DEFENSIVE POWER |
|---|---|---|---|---|---|
| C00055 | XXXXX | × | 500 | 1000 | 800 |
| A00222 | XXXXX | ○ | 2000 | 400 | 70 |
| B00030 | XXXXX | △ | 900 | 10 | 600 |
| D00600 | XXXXX | □ | 60000 | 90000 | 80000 |
| B00050 | XXXXX | △ | 30 | 600 | 40 |
| ⋯ | ⋯ | ⋯ | ⋯ | ⋯ | ⋯ |

| IDENTIFICATION INFORMATION | CARD-READ TIME (YEAR-MONTH-DAY-TIME) |
|---|---|
| C00055 | 200108221310 |
| A00222 | 200108221311 |
| B00030 | 200108221312 |
| D00600 | 200108221313 |
| B00050 | 200108221314 |
| ..... | ..... |
| ..... | ..... |

303

COMPUTER DEVICE FOR IMPLEMENTING A TRADING CARD GAME AND CONTROL METHOD THEREFOR, PROGRAM EXECUTED BY COMPUTER DEVICE, CONTROLLER, SYSTEM, AND GAME CARDS

This application is a continuation of Application No. 10/161,666, filed Jun. 5, 2002, the contents of which are incorporated herein by reference.

BACKGROUND OF THE INVENTION

1. Field of the Invention

The present invention relates to trading card games and, more particularly, to a computer device for implementing a trading card gage and a control method therefor, a program executed by the computer device, and a controller, a system, and a game card which are related thereto.

2. Description of the Related Art

Conventionally, trading cards on which sports players' images and characteristics are printed (e.g., baseball cards) traded between card buffs. The value of such cards depends on a variety of factors, including their rarity. In addition, recently, fighting card games using cards on which images and characteristics of cartoon characters, etc., are printed have grown in popularity. In such fighting card games, victory or defeat is often determined by whether a game player has rare cards, which cards typically have having high offensive or defensive power.

Game players trade (or exchange) their cards, and create their own decks of cards by purchasing sets (combinations of rare cards and ordinary cards) of cards sold by card game companies. The card games are characterized in that the cards themselves, especially rare cards, can have high commercial values. Also, on the video game market, similar fighting card games have been developed and marketed, and rare cards can be electronically traded in a video game between game players.

As described above, the card game market consists of two types. A conventional card game market for actual cards and a card game market for virtual cards in video games.

The above-described conventional technology has a problem in that the card game market cannot be expanded since cards collected in conventional card games cannot be used in card games of the video game type.

Another problem is that if the collected cards can be used in the card games of the video game type, their commercial values may decrease unless recording (copying) of them is limited.

Also, if the collected cards can be used in the card games of the video game type, their commercial values may decreases unless the use thereof is confirmed after recording them.

Further, if the collected cards can be used in the card games of the video game type and the use thereof is not confirmed after recording them, by continuously using a single card in a limitless number of video game machines, the rarity of the card can be substantially decreased and the card and each game machine cannot be cooperatively operated so that it is difficult to create a unified game world.

In addition, if the collected cards cannot be used in the card games of the video game type, it is impossible to set them to have differences. Consequently, their commercial values decrease.

SUMMARY OF THE INVENTION

According to an aspect of the present invention, a program for a game using a plurality of cards is provided which is executed in a computer device. The program includes the steps of generating a combination of the cards for a game player of the game by using the identification information of the cards, and changing the combination of the cards in response to an instruction of the game player.

According to another aspect of the present invention, a computer device for executing a program using a plurality of cards to play a game is provided. The computer device includes a receiving unit for receiving the identification information of each of the cards, a generating unit for generating a combination of the cards for a game player of the game by using the received identification information, and a changing unit for changing the combination of the cards in response to an instruction of the game player.

According to another aspect of the present invention, a method for controlling a computer device for playing a game using a plurality of cards is provided. The method includes the steps of receiving the identification information of each of the cards, generating a combination of the cards for a game player of the game by using the received identification information, and changing the combination of the cards in response to an instruction of the game player.

According to another aspect of the present invention, a controller for controlling a computer device for playing a game using a plurality of cards is provided. The controller includes a reading unit which reads identification information from each of the cards, and a control unit which transmits the read identification information to the computer device so that a combination of the cards for a game player of the game is created, and which transmits, to the computer device, information requesting the computer device to change the combination of the cards in response to an instruction of the player.

According to another aspect of the present invention, a system for executing a program for playing a game using a plurality of cards is provided. The system includes a computer device for executing the program, and a controller which controls the computer device. The computer device performs receiving the identification information of each of the cards which is read by the controller, generating a combination of the cards for a game player of the card game by using the received identification information, and changing the combination of the cards in response to an instruction of the game player.

According to another aspect of the present invention, a card for use in a computer device for executing a game program constituting a game is provided. The card includes a storage unit for storing the identification information of the card. After the identification information of the card is read, the read identification information is used to generate for a game player of the game, a combination of the card and another card by the computer device.

According to another aspect of the present invention, a program for controlling a computer device to execute a game using a plurality of cards is provided in which the identification information of each of the cards is read and the read identification information is used to restrict card recording for a game player of the game.

According to another aspect of the present invention, a computer device for executing a game using a plurality of cards is provided in which the identification information of each of the cards is read and the read identification information is used to restrict card recording for a game player of the game.

According to another aspect of the present invention, a controller connected to a computer device for executing a game using a plurality of cards is provided in which the identification information of each of the cards is read and the read identification information is used to restrict card recording for a game player of the game.

According to another aspect of the present invention, a method for controlling a computer device for executing a game using a plurality of cards is provided in which the identification information of each of the cards is read and the read identification information is used to restrict card recording for a game player of the game.

According to another aspect of the present invention, a system for executing a game using a plurality of cards is provided. The system includes a computer device for executing the game, and a controller for controlling the computer device. The computer device restricts card recording for a game player of the game by receiving from the controller the identification information of each of the cards which is obtained such that the controller performs reading, and using the received identification information.

According to another aspect of the present invention, a card for use in a computer device for a computer device for executing a game using a plurality of cards is provided. The card includes a storage unit for storing the identification information of each of the cards, and the identification information is read and the read identification information is used to restrict card recording.

According to another aspect of the present invention, a program for executing a game using a plurality of cards is provided in which, after the identification information of a card among the cards is read and used to record the card, the program requests re-reading of the card.

According to another aspect of the present invention, a computer device for executing a game using a plurality of cards is provided in which, after the identification information of a card among the cards is read and used to record the card, the computer device requests re-reading of the card.

According to another aspect of the present invention, a controller connected to a computer device for executing a game using a plurality of cards is provided in which, after the identification information of a card among the cards is read and used to record the card, the controller requests re-reading of the card.

According to another aspect of the present invention, a method for controlling a computer device for executing a game using a plurality of cards is provided in which, after the identification information of a card among the cards is read and used to record the card, the method requests re-reading of the card.

According to another aspect of the present invention, a system for executing a game using a plurality of cards is provided. The system includes a computer device for executing the game, and a controller for controlling the computer device. After receiving from the controller the identification information of a card among the cards which is obtained such that the controller performs reading, and using the received identification information to record the card, the computer device requests re-reading of the card.

According to another aspect of the present invention, a card for use in a computer device for executing a game using a plurality of cards is provided. The card includes a storage unit for storing the identification information of a card among the cards. The identification information of the card is read and the read identification information is used.

According to another aspect of the present invention, a program for controlling a computer device to execute a game using a plurality of cards is provided in which, after the identification information of a card among the cards is read and used to record the card, the card information of the card is corrected based on the time the card is read.

According to another aspect of the present invention, a computer device for executing a game using a plurality of cards is provided in which, after the identification information of a card among the cards is read and the read identification information is used to record the card, the card information of the card is corrected based on the time the card is read, by the computer device.

According to another aspect of the present invention, a method for controlling a computer device for executing a game using a plurality of cards is provided in which, after the identification information of a card among the cards is read and the read identification information is used to record the card, the card information of the card is corrected based on the time the card is read.

According to another aspect of the present invention, a system for executing a game using a plurality of cards is provided. The system includes a computer device for executing the game, and a card reader for the computer device. After the identification information of a card among the cards is read and the read identification information is used to record the card, the card information of the card is corrected by the computer device based on the time the card is read.

According to another aspect of the present invention, a card for use in a computer device for executing a game is provided. The card includes a storage unit for storing the identification information of the card. The stored identification information is used to correct the card information of the card, based on the time the card is read.

According to another aspect of the present invention, a chief computer device to which a plurality of computer devices for executing a game using a plurality of cards can be linked is provided in which the identification information of each of the cards is read and used to restrict card recording for a game player of the game.

According to another aspect of the present invention, a method for controlling a chief computer device to which a plurality of computer devices for executing a game using a plurality of cards can be linked is provided in which the identification information of each of the cards is read and used to restrict card recording for a game player of the game.

According to another aspect of the present invention, a chief computer device to which a plurality of computer devices for executing a game using a plurality of cards can be linked is provided in which, after reading the identification information of each card of the cards and using the read identification information to record the card, the chief computer device requests re-reading of the card.

According to another aspect of the present invention, a method for controlling a computer device for executing a game using a plurality of cards is provided in which, after the identification information of each card of the cards is read and the read identification information is used to record the card, re-reading of the card is requested.

Further objects, features and advantages of the present invention will become apparent from the following description of the preferred embodiments with reference to the attached drawings.

BRIEF DESCRIPTION OF THE DRAWINGS

FIG. 7 is an illustration showing a deck (a list of pieces of card-identification information and pieces of card information) of game player A.

FIG. 8 is an illustration showing a deck (a list of pieces of card-identification information and pieces of card information) of game player B.

FIG. 16 is an illustration of a table of card-read times on cards in the deck of player B.

DESCRIPTION OF THE PREFERRED EMBODIMENTS

First Embodiment

A preferred embodiment of the present invention is described below.

Figure 1:
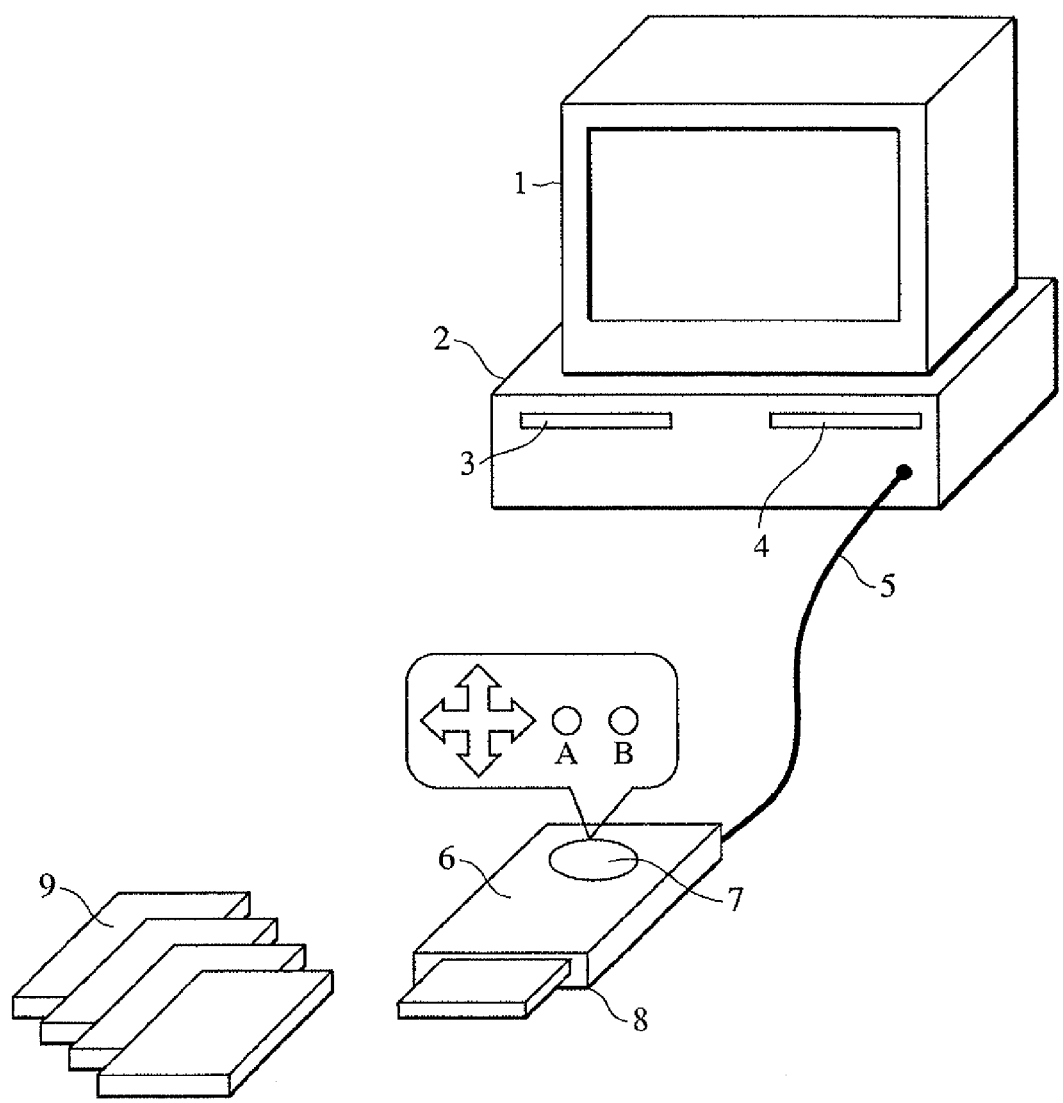
FIG. 1 is a perspective view showing a card game system according to an embodiment of the present invention.

FIG. 1 is a perspective view showing a card game system according to a first embodiment of the present invention.

FIG. 1 shows a display 1 such as a cathode-ray tube (CRT) or a television display. The display 1 displays a card game executed by a computer device 2 such as a personal computer, a video game machine, or a set-top box. FIG. 1 also displays a floppy disk connector 3 into which a floppy disk storing a game program may be loaded, and a CD-ROM connector 4 into which a compact-disk read-only memory (CD-ROM) or the like may be loaded.

Signals from keys 7 (four directional keys and switches A and B) on each controller 6 (card reader), and identification information of each card 8 or 9 which is read by the controller 6 are transmitted to the computer device 2 via an interface cable 5. The controller 6 also displays card information (e.g., an image, a name, and comments corresponding to the identification information) of each game player on a liquid crystal display unit (not shown) by receiving the information transmitted from the computer device 2. In this embodiment, a number of controllers 6 that corresponds to the number of game players are connected to the computer device 2. However, it is to be understood that other numbers of controllers are possible. The controller 6 can exchange signals with the computer device 2 by infrared communication.

Figure 2:
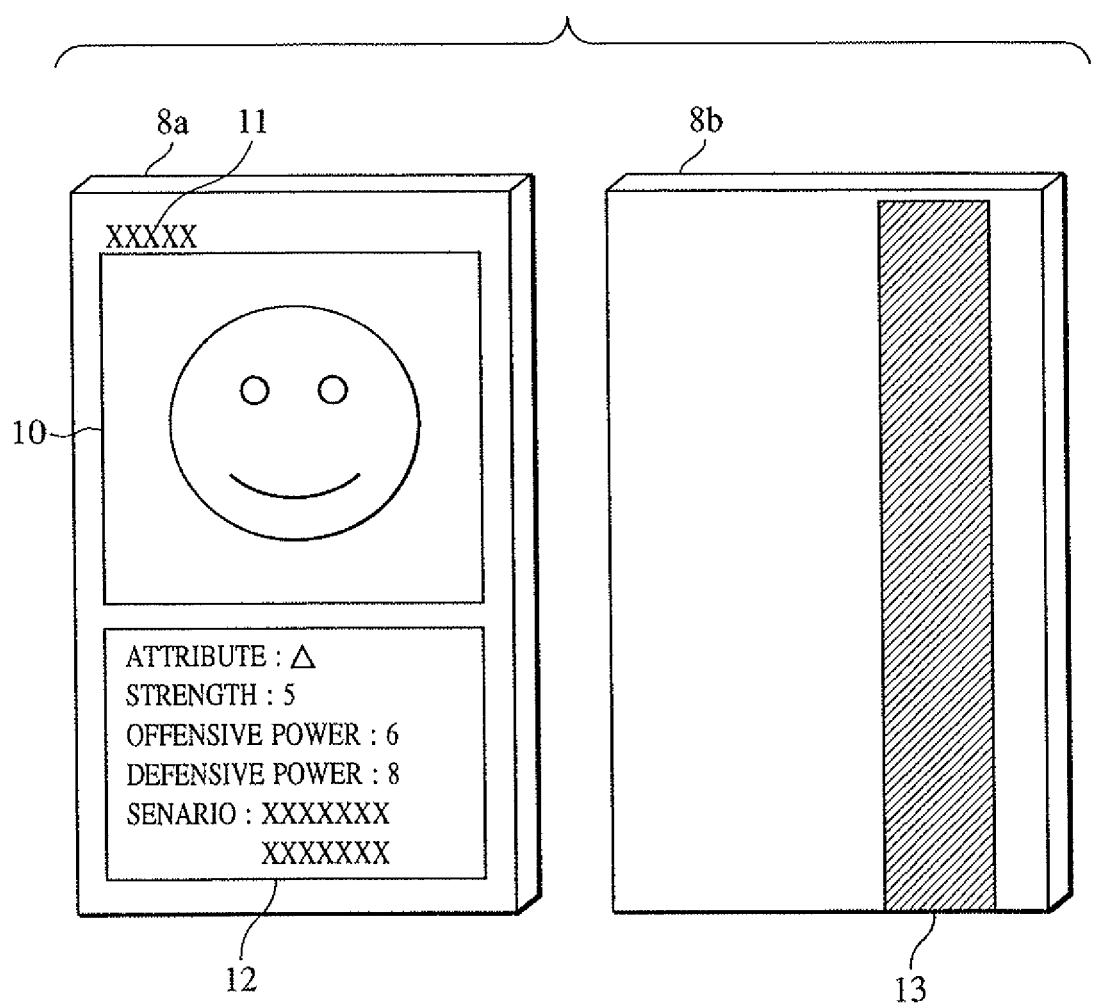
FIG. 2 is a plan view showing the exterior of a card for use in a card game device of the present invention.

FIG. 2 shows an example of the card 8. The card 8 has a main surface 8a and a back surface 8b.

The main surface 8a has formed or recorded on it, for example, card information relating to a game character in a fighting card game, such as an image 10, a name 11, a comment section 12 including an attribute, strength, offensive power, defensive power, and a game scenario. The back surface 8b has a magnetic tape 13 storing the identification information of the game character. The card may be made of paper using conventional techniques. By using paper to make the card 8, and storing minimum information on the game character on the magnetic tape 13 or in a bar code (not shown), the card production cost can be reduced. By controlling a game program executed by the computer device 2 to store card information corresponding to identification information, card information on a card read by the card reader 6 can be displayed on the display 1.

The cards may have independent, commercial values (different economic values) in accordance with game characters formed for them, and offensive and defensive powers indicated by identification information on them.

Figure 3:
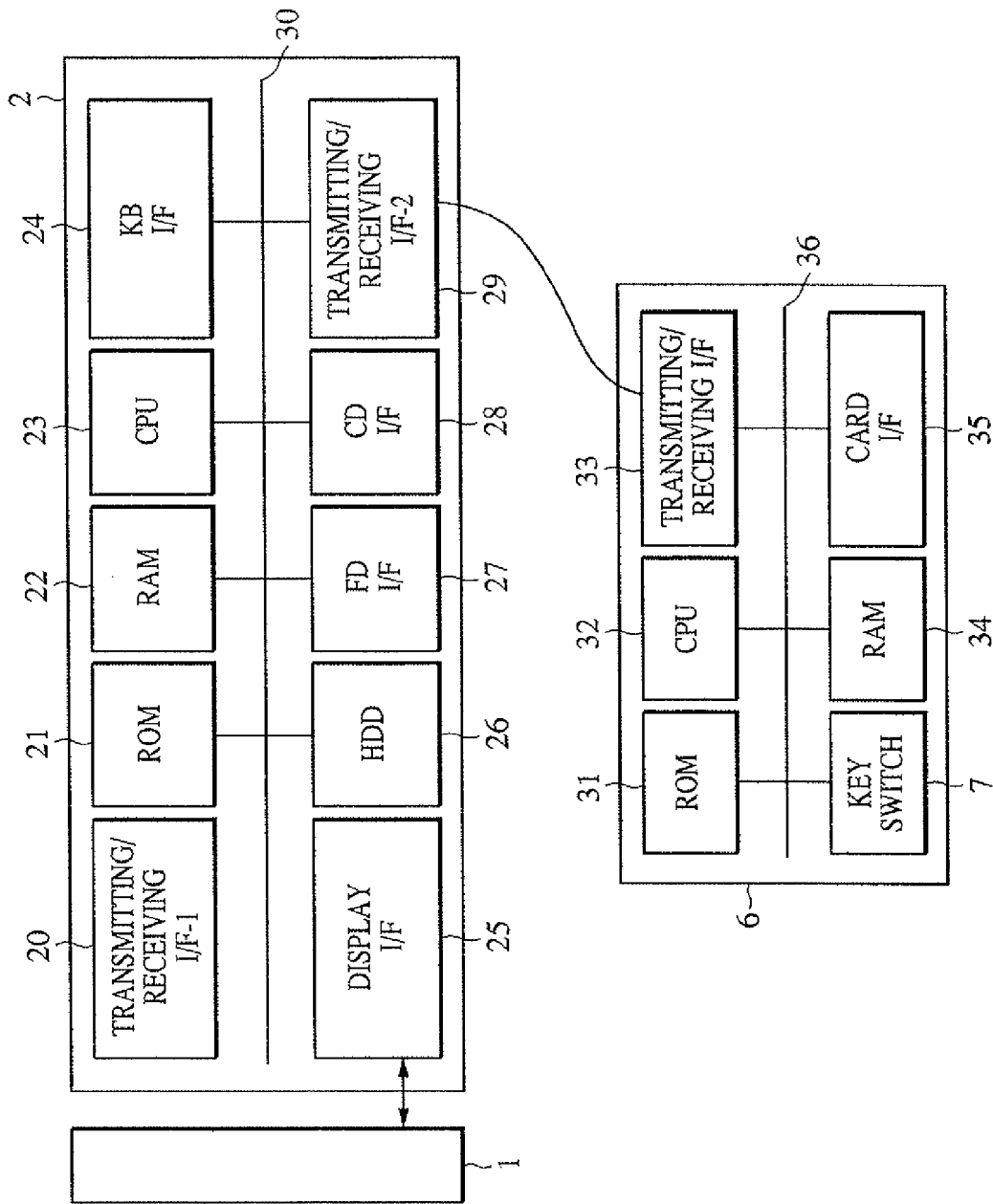
FIG. 3 is a block diagram showing the card game system shown in FIG. 1.

FIG. 3 is a block diagram showing the card game system shown in FIG. 1.

Based on a system program (including a game program indicated by the flowchart shown in FIG. 5, card information, and a card information table described later) stored in a ROM 21, the CPU 23 of the computer device 2 executes a game program after loading it into a random access memory (RAM) 22 from one of a hard disk drive (HDD) 26, and a storage medium such as a floppy disk loaded into an FD interface (I/F) 27 or a CD-ROM loaded into a CD I/F 28, and uses a display I/F 25 to display the game on the display 1. The CPU 23 can also execute the game program after downloading it into the RAM 22 from a server connected to a network (not shown) via a transmitting/receiving I/F-1 20. In addition, the CPU 23 receives external signals by using a keyboard (KB) I/F 24 connected to a system bus 30, and exchanges signals with the controller 6 through a transmitting/receiving I/F-2 29.

The CPU 32 of the card reader 6 executes a control program (illustrated by the flowchart shown in FIG. 6) stored in a ROM 31, and transmits signals from the keys 7 to the computer device 2 via the interface cable 5. Also, under control of the CPU 32, the identification information of the card 8 is read by a card I/F 35 (reader unit) and is temporarily stored in a RAM 34 before being transmitted to the computer device 2.

Figure 4:
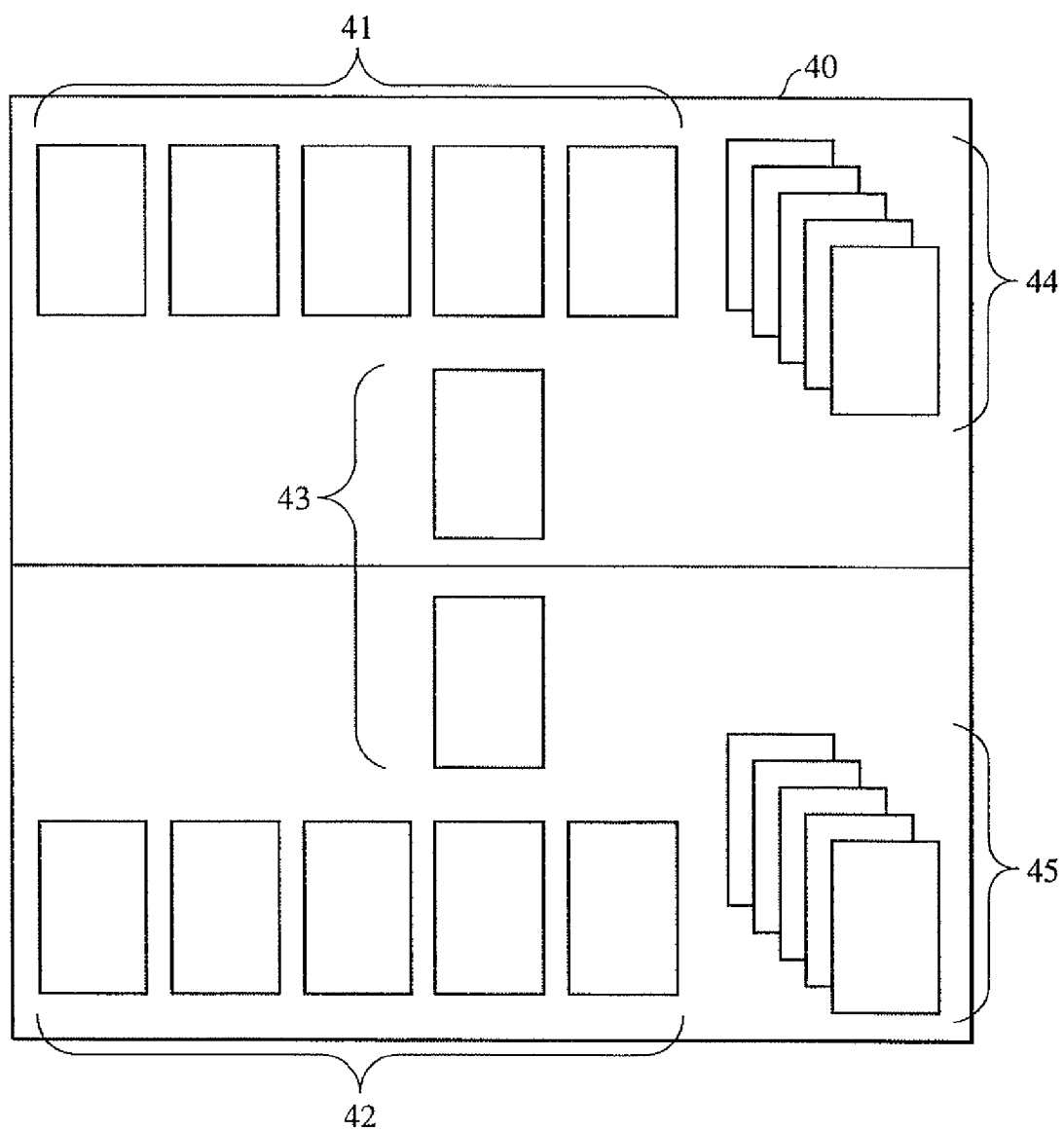
FIG. 4 is an illustration of a game method of a common card game.

FIG. 4 illustrates a common method for playing a card game. However, it is to be understood that methods and games, other than the below-described method and game, are possible.

FIG. 4 shows a screen 40 of the game which is displayed on the display 1, a deck 44 (which in this embodiment is a combination of 40 cards) of player A, a deck 45 (a combination of 40 cards) of the player B. FIG. 4 shows a set 41 of (e.g., five) cards sequentially drawn from the top of the deck 44 by player A, and a set 42 of (e.g., five) cards sequentially drawn from the top of the deck 44 by player B. From each of the sets 41 and 42, one card is drawn by each of players A and B and is displayed with its main surface turned up, and the game is played by comparing information on both cards. Creation of a strong deck by considering a combination and order of cards greatly influences the result of game.

The above-described operation can be achieved such that the game program is executed based on key signals from the controller 6 and identification information. The operations of the computer device 2 and the controller 6 are described below with reference to the flowcharts shown in FIGS. 5 and 6.

Figure 5:
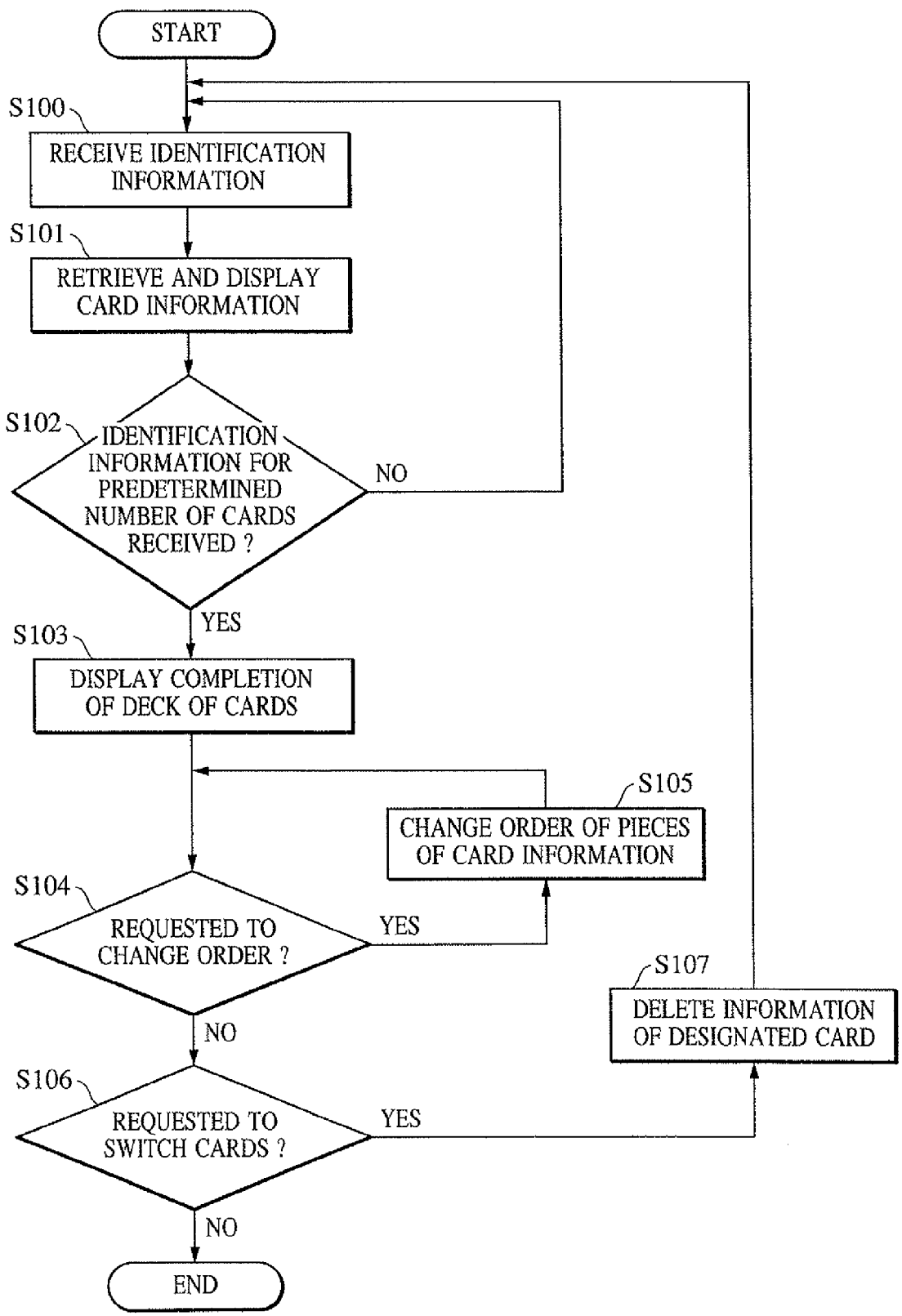
FIG. 5 is a flowchart showing a deck creating flow executed by the computer device 2 shown in FIG. 2.

FIG. 5 is a flowchart of the game program (deck creating process) executed by the computer device 2.

The game program is activated when the player uses the controller 6 to selects a deck-creation initiating icon on a game menu screen displayed on the display 1.

In step S100, the CPU 23 receives identification information transmitted from the controller 6 via the interface cable 5. In step S101, the CPU 23 retrieves card information corresponding to the received identification information by referring to a card information table (table for managing identification information and card information of cards usable in the game program) stored in the RAM 22, and displays, on the display 1, the card information (e.g., the image 10, the name 11, and the comment section 12 including the attribute, strength, the offensive power, the defensive power, and the game scenario) in the form of a list. In step S102, the CPU 23 determines whether or not it has received identification information for a predetermined number of (e.g., 40) cards by checking a counter that is incremented whenever the identification information is received. If the CPU 23 has not received the identification information for the predetermined number of cards, steps S100 to S102 are repeated. If the CPU 23 has received the identification information for the predetermined number of cards, in step S103, it displays, on the display 1, a message indicating completion of creating the deck and a list of the card information of the deck, and icons representing completion of creating the deck, changing the deck (order change), and changing the deck (card switching) while waiting for the player to select one of the icons. In step S104, based on a key signal from the controller 6, the CPU 23 determines whether or not it is requested to perform a deck changing operation (order change). If it is requested to perform changing the deck (order change), it changes in the above list the order of pieces of the card information which is changed in step S105. If the CPU 23 is not requested to perform changing the deck, in step S106, the CPU 23 determines, based on a key signal from the controller 6, whether or not it is requested to perform a deck changing operation (card switching). If it is requested to switch the cards, in step S107, it deletes the card information of a designated card from the above list, and repeatedly performs processing from step S100 in order to create a list for the predetermined number of cards. In step S106, if the CPU 23 has determined that it is not requested to perform a deck changing operation (card switching), in other words, when completion of creating the deck is selected, it terminates the deck creating process.

When, in step S103, the display 1 displays the icons representing completion of creating the deck, changing the deck (order change), and changing the deck (card switching), the player uses the keys of the controller 6 to designate the card information of cards the order of which should be changed or card information that should be deleted, by referring to the displayed list (the card information for the predetermined number of cards). The predetermined number of cards can be changed based on a signal from the controller 6.

Figure 6:
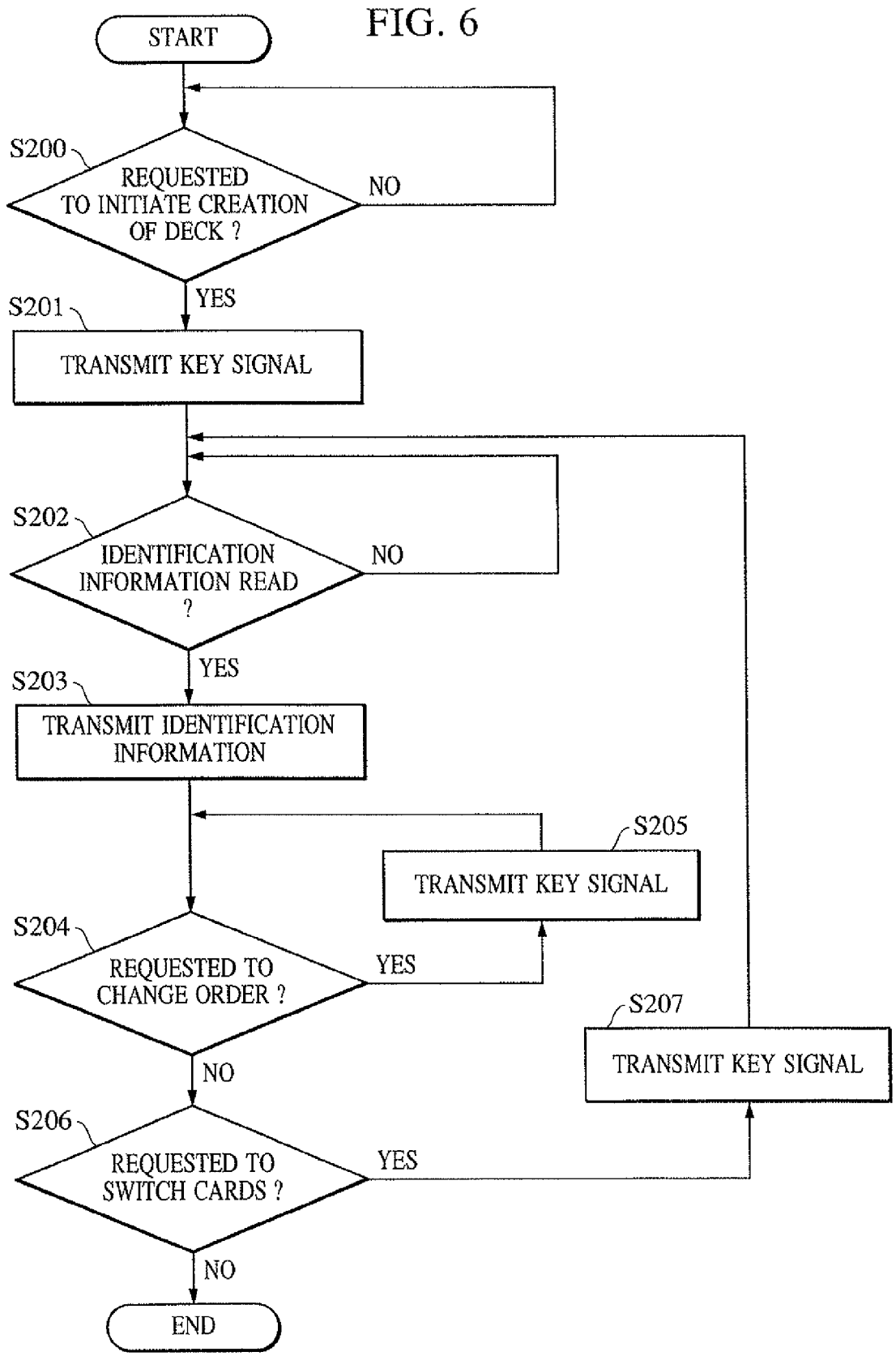
FIG. 6 is a flowchart showing a card reading flow executed by the controller 6 shown in FIG. 2.

FIG. 6 is a flowchart of a control program (card-reading process) executed by the controller 6. This control program is stored in the ROM 31 and is activated when the power supply (not shown) of the controller 6 is turned on.

In step S200, the CPU 32 determines whether a key of the keys 7 which selects the deck-creation initiating item has been pressed, which key selects the deck-creation initiating item on the game menu screen displayed on the display 1. If the key has been pressed, in step S201, a signal (deck-creation initiating request) corresponding to the key is transmitted to the computer device 2. In step S202, the CPU 32 determines whether or not the reader unit 35 has read the identification information of the card loaded by the player. If the reader unit 35 has read the identification information, in step S203, the CPU 32 transmits the read identification information to the computer device 2. In step S204, the CPU 32 determines whether or not a key of the keys 7 has been pressed, which key selects the icon of changing the deck displayed on the display 1. If the key has been pressed, in step S205, a signal corresponding to the key and the card information of cards of which the order should be changed are transmitted to the computer device 2. In step S204, if the CPU 32 has determined that key has not been pressed, in step S206, the CPU determines whether or not a key of the keys 7 has been pressed, which key selects the icon of changing the deck (card switching). If the key has been pressed, a signal corresponding to the key, and a key signal for designating card information that should be deleted are transmitted to the computer device 2. After that, by repeatedly performing processing from step S202, the card information of a new card is transmitted to the computer device 2. In step S206, if the CPU 32 has determined that a key of the keys 7 has been pressed which selects the icon of completion of creating the deck, the CPU 32 terminates the card reading process.

Selection of the icons of initiating creation of the deck, completion of creating the deck, changing the deck order (order change), and changing the deck (card switching), and selection of the card information of cards the order of which should be changed and the card information that should be deleted are performed such that the player uses the four directional arrow keys (cursor) and the switches A and B by referring to the menu screen and the list displayed on the display 1.

The present invention can be applied to a single device, a system composed of a plurality of devices, and a system that performs processing while establishing connection by using a network such as a local area network or a wide area network if the functions of the present invention are implemented by the device and the systems, unless otherwise noted. For example, a control program (game program) may be downloaded for execution from a server to a computer device 2 (described later) via a network.

The present invention described in the above embodiment is applied to a computer device as a single device (a personal computer, a video game machine, a set-top box, etc.), and may further be applied to a system composed of a plurality of devices (e.g., a server and other computer devices that are connected by a network). For example, by enabling a plurality of game players to participate in the card game, the card game can be played with game players around the world.

As described above, by storing identification in a magnetic tape on the card, and creating a card game so that card information corresponding to the identification information is stored in a game program, an inexpensive card game can be widely provided. When a new card game in which the card information of new cards is recorded is created (e.g., for version upgrading), a card storing identification information corresponding to the card information may be provided to the game player. In this type of business method, a new card game according to the present invention can be rapidly marketed. In addition, by storing in a card all or part of its card information, the expandability and low price of the card game itself can be implemented. Specifically, the card reader 6 reads the identification information and card information of each card, the CPU 32 transmits the read information to the computer device 2, and the CPU 23 can create the deck by using the card information table stored in the game program and the transmitted identification information and card information. In this manner, by storing the card information of all cards used for the card game in the cards, the storage capacity of the game program can be reduced. Thus, version upgrading of the game program is facilitated.

Instead of the magnetic tape, an optically readable medium such as a barcode may be used for storage, and a memory chip may be used for electric storage. In particular, in order to store in a card its identification information and card information, the memory chip is preferable in storage capacity.

Although a fighting card game has been used to describe the embodiment of the present invention, a card game using cards of sport players who play for a team may be used. For example, by arbitrarily combining the cards of team players in each sport to create a deck, the strongest team can be organized. For example, the number of cards in a deck corresponds to the number of persons in each sport team (9 players in baseball, 11 players in American football, 5 players in basket ball, 6 players in volleyball, 11 players for soccer, etc.).

As described above, according to the above embodiment, since the controller 6 uses the identification information of a read card to create a deck for a game player, a new game that is an amalgam of a card game and a video game can be provided.

According to the above embodiment, in order that the identification information of a card may be read from the card, and a combination of cards for a game player may be created, the identification information, which is read in response to a request, can be transmitted to the computer device 2. Thus, a new game that is an amalgam of a card game and a video game can be provided.

According to the above embodiment, a controller for computer device that executes a game program, a computer device which receives the identification information of a card read by the controller and which uses the identification information to create a combination of cards for a game player can be provided.

According to the above embodiment, a card can be provided which includes a storage unit for storing the identification information of each card and in which the identification information of the card when it is read by a controller is used for a computer device to create a combination of cards for a game player.

Accordingly, a new innovative game that is an amalgam of a conventional card game and a video game can be provided, with its commercial value maintained.

Second Embodiment

In a second embodiment of the present invention, the structure of a card game system, as well as the block diagram of the card game system, the card, the common method for playing a card game, the game program (deck-creating process) executed by a computer device, and the control program executed by a controller are identical to those in the first embodiment. Accordingly, descriptions thereof are omitted.

FIGS. 7 and 8 show card information lists of the decks created by executing the processes indicated by the flowcharts in FIGS. 5 and 6. Pieces of identification information of a predetermined number of cards, and pieces (names, attributes, strength, offensive power, defensive power) of card information of the cards are recorded in a predetermined area of the RAM 22 of the computer device 2 and are displayed for game players on the display 1. The card information lists of the decks for the game players can be also displayed on a display (not shown) of each card reader 6 for each game player.

As FIG. 7 shows, a deck of cards for game player A includes a rare card that has the name "XXXXX" having the identification information "B00010", the attribute indicated by a triangle, the strength "20000" points, the offensive power "50000" points, and the defensive power "60000" points. Also, as FIG. 8 shows, a deck of cards for game player B includes a rare card that has the name "XXXXX" having the identification information "D00600", the attribute indicated by a square, the strength "60000" points, the offensive power "90000" points, and the defensive power "80000" points. If a game player possesses such rare cards, a deck of cards of the game player is strong. Accordingly, game players obtain stronger cards by trading cards between game players, as the spoils of game, or from a purchased card set. In addition, rare cards are often traded for high prices between card game buffs.

In a case in which a rare card is copied and used in a game, pleasure in the game disappears and the commercial value of the rare card decreases. Thus, recording of the rare card in the computer device 2 (such as a personal computer, a video game machine, or a set-top box) must be restricted.

Figure 9:
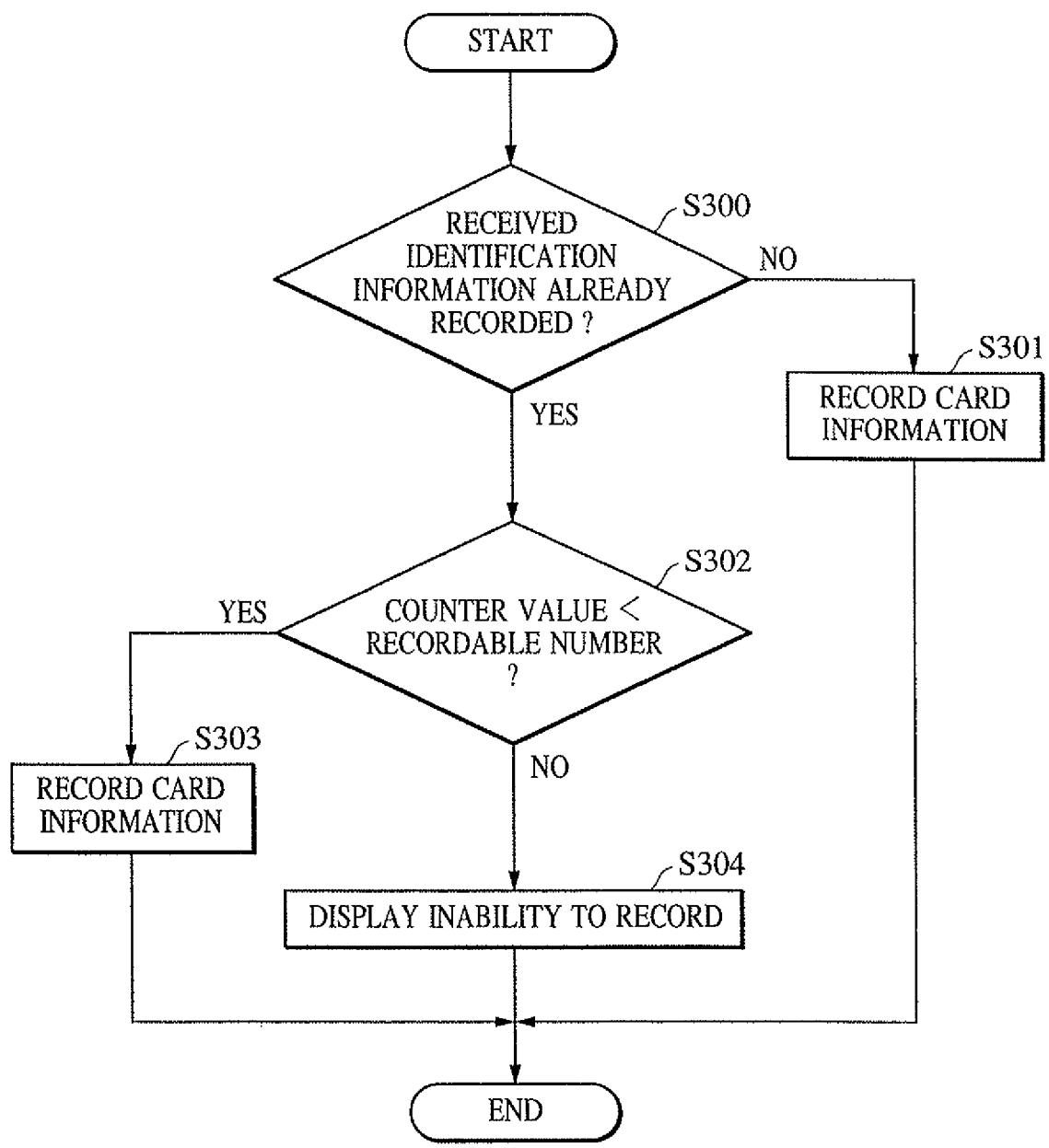
FIG. 9 is a flowchart showing a recording-restriction-1 process executed by the computer device 2 shown in FIG. 1.

FIG. 9 is a flowchart of a program (recording-restricting process-1) executed by the computer device 2.

This program is activated by the CPU 23 after it receives the identification information in step S100 of the flowchart in FIG. 5. After executing steps S300 to S304, the CPU 23 returns to step S102 in FIG. 5. The program in FIG. 9 does not need to be related to the program in FIG. 5. It can be applied to, for example, another type of game program that does not create a deck of cards, and may also be independently executed.

When, in step S100 in FIG. 5, the CPU 23 receives the identification information of the card 8 from the controller 6 via the interface cable 5, it determines in step S300 in FIG. 9 whether or not the identification information is recorded in a predetermined area (e.g., a deck recording area for player) of the RAM 22. If the CPU 23 has determined in step S300 that the identification information is not recorded, in step S301, after referring to the card information table (for managing pieces of identification information and card information of cards usable in the game program and a recordable number of the cards) that is loaded into the RAM 23 beforehand, the pieces of identification information and the pieces of card information corresponding thereto, the CPU 23 copies to the above predetermined area the identification information and the card information corresponding thereto, and increases the value of a counter (not shown) before returning to step S102 in FIG. 5 (ending the program). If the CPU 23 has determined in step S300 that the received identification information is already recorded in the predetermined area, after comparing the counter value corresponding to the identification information and the recordable number of cards in the card information table, and finding that the counter value is less than the recordable number of cards, the CPU 23 records the identification information and card information received in step S303 in the predetermined area, and increase the counter value before returning step S102 in FIG. 5 (ending the program). If the CPU 23 has determined in step S302 that the counter value has reached the recordable number of cards, it displays a message indicating inability of recording on the display 1, and returns to step S102 in FIG. 5 (ends the program).

As described above, by using the card information table to manage the recordable number of cards for each card usable in the game program, the number of recordable cards, such as the rare card represented by the identification information "B00010" shown in FIG. 7 and the identification information "D00600" shown in FIG. 8, is set to only one, and the number of recordable supplementary cards that enhance the strength, offensive power, and defensive power of other more common cards to increase their rarity is set to four. Accordingly, game software manufactures can maintain the commercial values of rare cards by creating a program designed so that the number of recordable cards is limited beforehand.

Also, in order to prevent the amount of data from being increased due to the management using the card information table of the number of recordable cards for each card, the card information table can be flagged to indicate whether or not a plurality of cards can be recorded.

Figure 10:
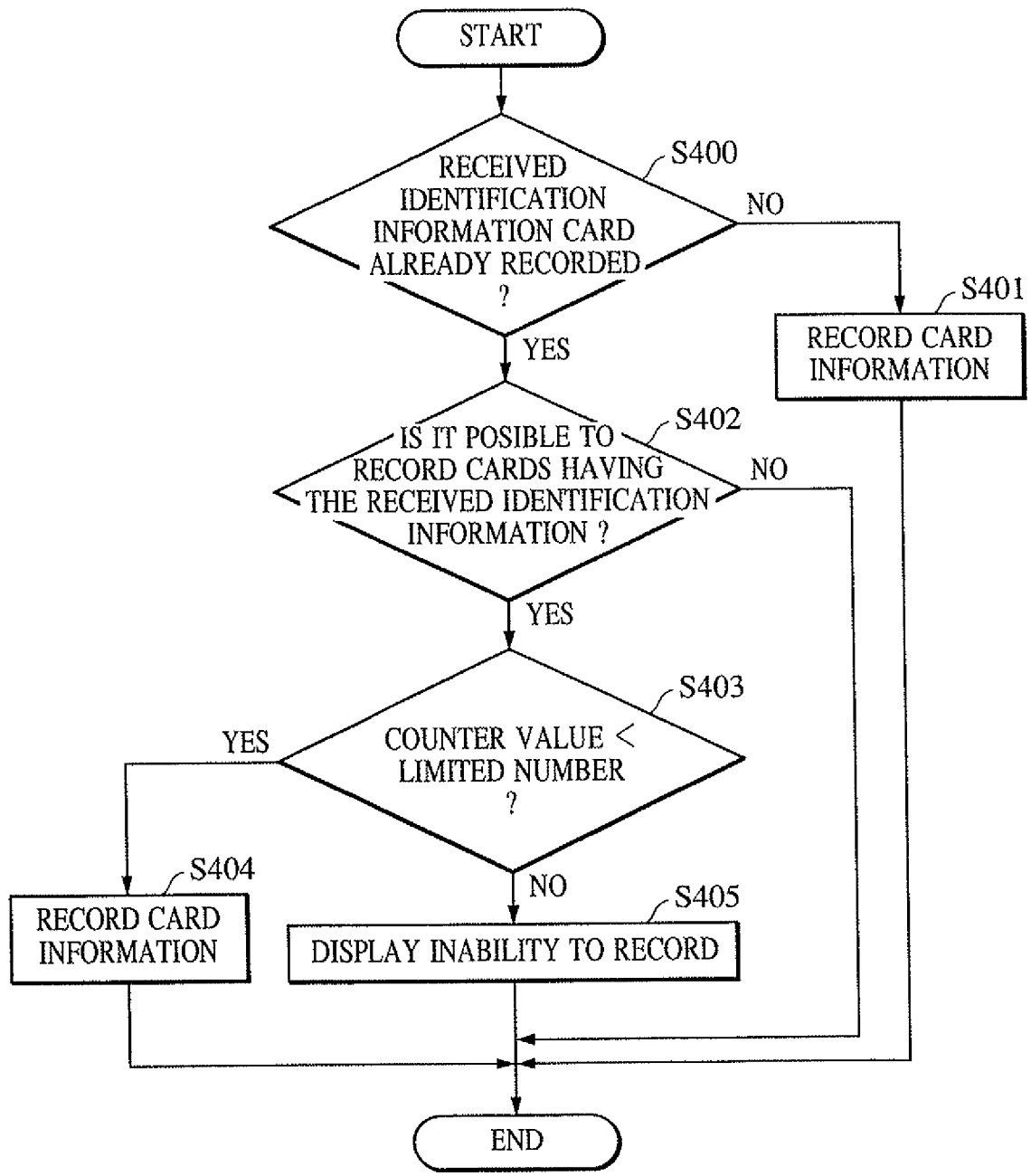
FIG. 10 is a flowchart showing a recording-restriction-2 process executed by the computer device 2 shown in FIG. 1.

FIG. 10 is a flowchart of a program (recording-restriction process) executed by the computer program 2.

This program is activated by the CPU 23 after it receives the identification information from the controller 6 in step S100 in FIG. 5. After executing steps S400 to S405, the CPU 23 returns to step S102 in FIG. 5. The program in FIG. 10 does not need to be related to the program in FIG. 5. It can be applied to, for example, another type of game program that does not create a deck of cards, and may be independently executed.

When, in step S100 in FIG. 5, the CPU 23 receives the identification information of the card 8 from the controller 6 via the interface cable 5, it determines in step S400 in FIG. 10 whether or not the identification information is recorded in the predetermined area (e.g., a deck recording area for player) of the RAM 22. If the CPU 23 has determined in step S400 that the identification information is not recorded, in step S401, after referring to the card information table (for managing pieces of identification information and card information of cards usable in the game program and a recordable number of the cards) that is loaded into the RAM 23 beforehand, the pieces of identification information and the pieces of card information corresponding thereto, the CPU 23 copies to the above predetermined area the identification information and the card information corresponding thereto, and increases the value of the counter (not shown) before returning to step S102 in FIG. 5 (ending the program). If the CPU 23 has determined in step S400 that the identification information is already recorded, it determines in step S402 whether a plurality of cards corresponding to the identification information can be recorded, by referring the flag of the card information table. If the CPU 23 has determined that the cards cannot be recorded (e.g., when the identification information represents a rare card), it returns to step S102 in FIG. 5 (ends the program). If the CPU 23 has determined that the identification information represents a plurality of recordable cards (e.g., when the flag is set to off condition), in step S403, it determines whether the counter value corresponding to the received identification information is less than a predetermined limited number of cards. In the game program, the limited number of cards is set beforehand to a maximum of four cards as recordable cards in the case of a card for which no flag is set. If the counter value is less than the limited number of cards, the CPU 23 records in the predetermined area the received identification information and the card information corresponding thereto, and increases the counter value before returning to step S102 in FIG. 5 (ending the program). If the CPU 23 has determined in step S403 that the counter value has reached the limited number of cards, it displays a message indicating inability of recording and returns to step S102 in FIG. 5 (ends the program).

As described above, for each card that is usable in the game program, by setting the flag to off-condition when a plurality of cards can be recorded, and by setting the flag to on-condition when a plurality of cards cannot be recorded and setting the limited number of cards (e.g., four cards at the maximum) in the game program, the number of rare cards as the card represented by the identification information "B00010" in FIG. 7 and the card represented by the identification information "D00600" in FIG. 8 can be set to only one, and the number of recordable supplementary cards that enhance the strength, offensive power, and defensive power of other more common cards can be set to four. Accordingly, the game soft manufacturers can maintain the commercial values of rare cards by creating the game program designed so that the flag and the limited number of recordable cards are set, without increasing the amount of data.

The present invention described in the second embodiment is applied to a computer device as a single device (a personal computer, a video game machine, a set-top box, etc.), and may further be applied to a system composed of a plurality of devices (e.g., a server and other computer devices that are connected by a network). For example, by enabling a plurality of game players to participate in the card game, the card game can be played with game players around the world.

By executing the programs (recording-restricting process-1 and process-2) shown in FIGS. 9 and 10 by using the controller 6 (card reader) or by using a chief computer device to which the computer device 2 can connect, operations similar to those in the second embodiment can be implemented. For example, it is possible that a plurality of computer devices be connected to a chief computer device (such as a personal computer, a video game machine, a set-top box, or a server). In this case, the computer devices may be linked to the chief computer device by wire, by radio, or by direct connection. The programs are stored in the ROM 31 and are executed by the CPU 32 in the computer device 2. The programs are also stored in the memory of the chief computer device connected to the computer device 2 and are executed by a CPU (not shown). The programs may be stored in a storage medium and may be provided to the computer device 2, the card reader 6, and the chief computer device.

As described above, the programs are used to use a computer device to execute a card game comprising a plurality of cards. Also, the programs use the identification information of each read card to restrict card recording for a game player. Each of the programs uses a table to manage beforehand the identification information of each card, its card information, and the number of recordable cards. Each of the programs restricts card recording by comparing the number of recorded cards corresponding to pieces of identification information and the number of recordable cards corresponding to the pieces of identification information which is stored in the table. Each of the programs restricts card recording by setting a limited number of recorded identical cards and setting, for each card, information indicating whether or not a plurality of cards can be recorded. Also, each of the programs uses a table to manage beforehand the identification information of each card, its card information, and information indicating whether or not a plurality of cards can be recorded. Each of the programs restricts card recording by comparing identification information, and information which is stored in the table and which indicates whether or not a plurality of cards corresponding to the identification information can be recorded, and comparing the number of recorded cards corresponding to read identification information and a limited number of cards.

Therefore, the computer device 2 that executes a card game in which a plurality of cards constitute a game can restrict card recording for a game player by using the identification information of each read card.

The card reader 6 that is connected to the computer device 2 that executes a card game in which a plurality of cards constitute a game can restrict card recording by using the identification information of each read card.

In addition, the chief computer device to which a plurality of computer devices that execute card games in each of which a plurality of cards constitute a game can restrict card recording by using the identification information of each read card.

Instead of the magnetic tape described in the second embodiment, an optically readable medium such as a barcode may be used for storage, and a memory chip may be used for electric storage. In particular, in order to store in a card its identification information and card information, the memory chip is preferable in storage capacity.

Although a fighting card game has been used to describe the second embodiment of the present invention, it is to be understood that a card game using sports trading cards may be used. For example, by arbitrarily combining the cards of team players in each sport to create a deck, the strongest team can be organized. For example, the number of cards in a deck may correspond to the number of players on a sport team (e.g., 9 players in baseball, 11 players in American football, 5 players in basket ball, 6 players in volleyball, 11 players for soccer, etc.).

As described above, according to the second embodiment, card recording for a game player can be restricted by using the identification information of each read card. Accordingly, a new game that is a complex of a card game and a video game can be provided.

In addition, by limiting the number of recorded cards, the rarity of rare cards can be maintained, and by controlling the set number of recorded cards, a new type of value standard different from the distributed amount in the market can be provided.

Third Embodiment

In a third embodiment of the present invention, the structure of a card game system, as well as a block diagram of the card game system, a card, the common method for playing a card game, the game program (deck-creating process) executed by a computer device, and the control program executed by a controller are identical to those in the first embodiment. Accordingly, descriptions thereof are omitted.

In a case in which a very rare card (as shown in FIG. 7 or FIG. 8) is copied and used in a game, pleasure in the game disappears and the commercial value of the rare card decreases.

By recording each card in the computer device 2, and confirming the use of the card, the commercial value and rarity of the card can be maintained, and interaction between the card and the game can create a game world having unity.

Figure 11:
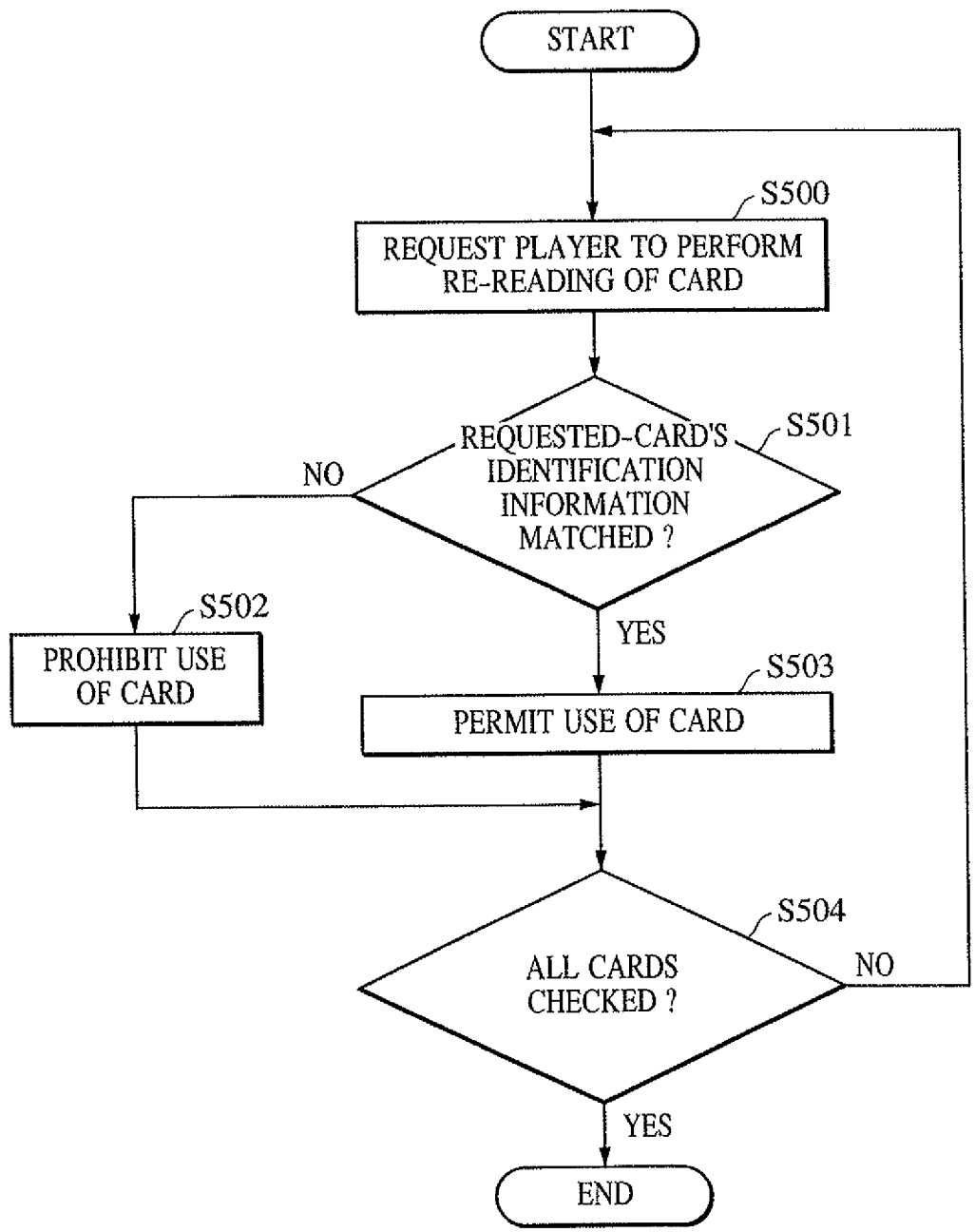
FIG. 11 is a flowchart showing a use-confirmation-1 process executed by the computer device 2 shown in FIG. 1.

FIG. 11 is a flowchart of a program (use confirmation-1) executed by the computer device 2.

After a deck for each game player is created by executing each step of the program in FIG. 5, this program is activated by the CPU 23 before the game is started or while the game is being played. The program in FIG. 11 does not need to be related to the program in FIG. 5. It can be applied to, for example, another type of game program that does not create a deck of cards, and may be independently executed.

In step S500 in FIG. 11, by using the display 1 or the display (not shown) of the controller 6 (card reader) so that re-reading of the top card of a deck list as shown in FIG. 7 or FIG. 8, the CPU 23 requests the game player to perform the re-reading. In step S501, the CPU 23 receives identification information transmitted as a result of the re-reading, and determines whether the received identification information matches the identification information of a card that causes the re-reading. If the determination in step S501 is negative, the CPU 23 prohibits the use of the card and executes step S504. If the determination in step S501 is positive, the CPU 23 permits the use of the card and executes step S504. In step S504, the CPU 23 determines whether it has confirmed all the cards. If the CPU 23 has determined that it has confirmed all the cards, it ends the use confirmation-1 process. If the CPU 23 has determined that it has not confirmed all the cards yet, it repeatedly executes the process from step S500 in order to confirm all the cards.

As described above, for example, in a case in which a game player plays a game after recording a card in the nonvolatile memories of a plurality of computer devices, if the game player is unable to comply with card-use confirmation by a computer device since the game player does not retain the card, the use of the card is prohibited. Thus, card copying can be prevented. Also, by requesting the game player to comply with confirmation of a previously recorded card, the game player must use the card even after recording the card, so that interaction between the card and the game can create a unified game world.

Nevertheless, it is not preferable, in comfortably playing the game, to request re-reading of all the cards that are presently recorded in the deck in order to perform confirmation of use.

Accordingly, by distinguishing between cards that must be re-read and cards that do not need to be re-read, and requesting re-reading of, for example, rare cards having high rarity values, the re-reading load can be reduced and the commercial values of the rare cards can be maintained.

Figure 12:
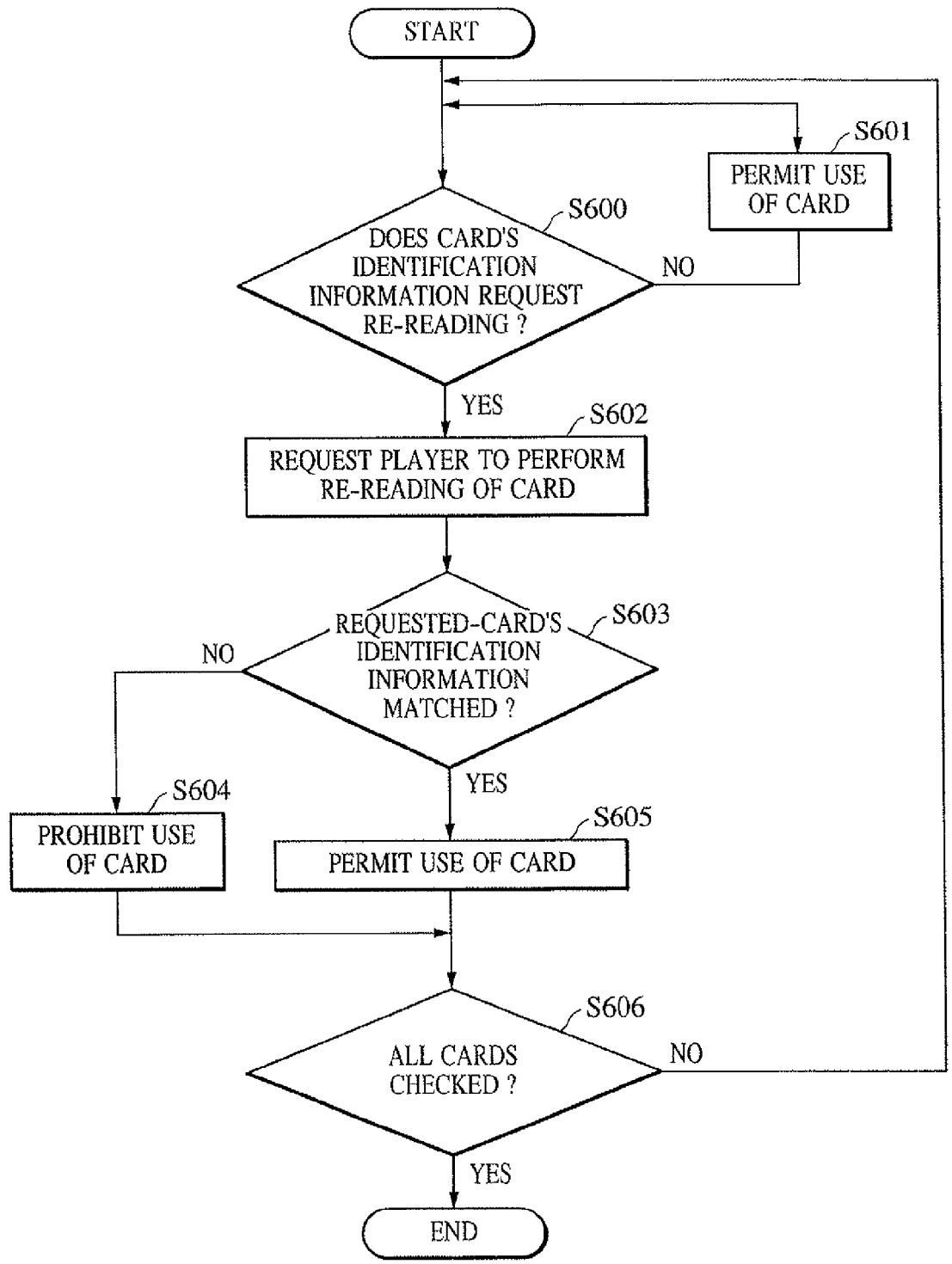
FIG. 12 is a flowchart showing a use-confirmation-2 process executed by the computer device 2 shown in FIG. 1.

FIG. 12 is a flowchart of a program (use confirmation-2) executed by the computer device 2.

Similarly to the program shown in FIG. 11, by executing each step in FIG. 5, after a deck for each game player is created, the program is activated by the CPU 23 before the game is started or while the game is being played. The program in FIG. 12 does not need to be related to the program in FIG. 5. It can be applied to, for example, another type of game program that does not create a deck of cards, and may also be independently executed.

In step S600 in FIG. 12, by referring to a card information table (table for managing identification information of cards usable in the game program, card information corresponding to the identification information, and information indicating whether or not re-reading of the identification information) loaded into the RAM 22 beforehand, the CPU 23 sequentially determines whether or not re-reading is requested by the identification information of each card from the top card of a deck of cards as shown in FIG. 7 or FIG. 8.

If the CPU 23 has determined in step S600 that the identification information of a card of interest does not request re-reading, it permits the use of the card in step S601, and executes step S600 for the next card of interest. If the CPU 23 has determined in step S600 that the identification information of the card of interest request re-reading, it requests the game player to perform re-reading of the card by using the display 1 or the display (not shown) of the controller 6 so that the re-reading is performed. In step S603, the CPU 23 receives identification information transmitted from the controller 6 (as a result of the re-reading) and determines whether or not the received identification information matches the identification information of the card for which re-reading in step S602 is requested. If the determination in step S603 is negative, the CPU 23 prohibits the use of the card in step S604, and executes step S606. If the determination in step S603 is positive, the CPU 23 permits the use of the card in step S605, and executes step S606. In step S606, the CPU 23 determines whether it has confirmed all the cards in the deck list. If the determination in step S606 is positive, the CPU 23 ends the use confirmation-2 process. If the determination in step S606 is negative, the CPU 23 repeatedly executes the process from step S600 in order to confirm all the cards.

As described above, by recording, in the above card information table, the identification information of a rare card as identification information requesting re-reading, when a game player who has already recorded the re-reading in the deck cannot comply with card-use confirmation by the computer device, the use of the card is prohibited. This can prevent the rare card from being copied. Also, by requesting confirmation of a once recorded rare card, a game player must use the rare card even after recording the card. Thus, interaction between the rare card and the game can create a unified game world. Also, re-reading of cards other than rare cards is not requested, so that the game can be comfortably played.

However, there may be a case in which a game player who possesses more rare cards needs more time to perform re-reading of the rare cards and cannot comfortably play the game.

Accordingly, by setting, for each rare card, conditions for requesting re-reading, and requesting the re-reading when the conditions are satisfied, inconvenience of re-reading of the rare card and maintenance of the rare card value balance each other.

Figure 13:
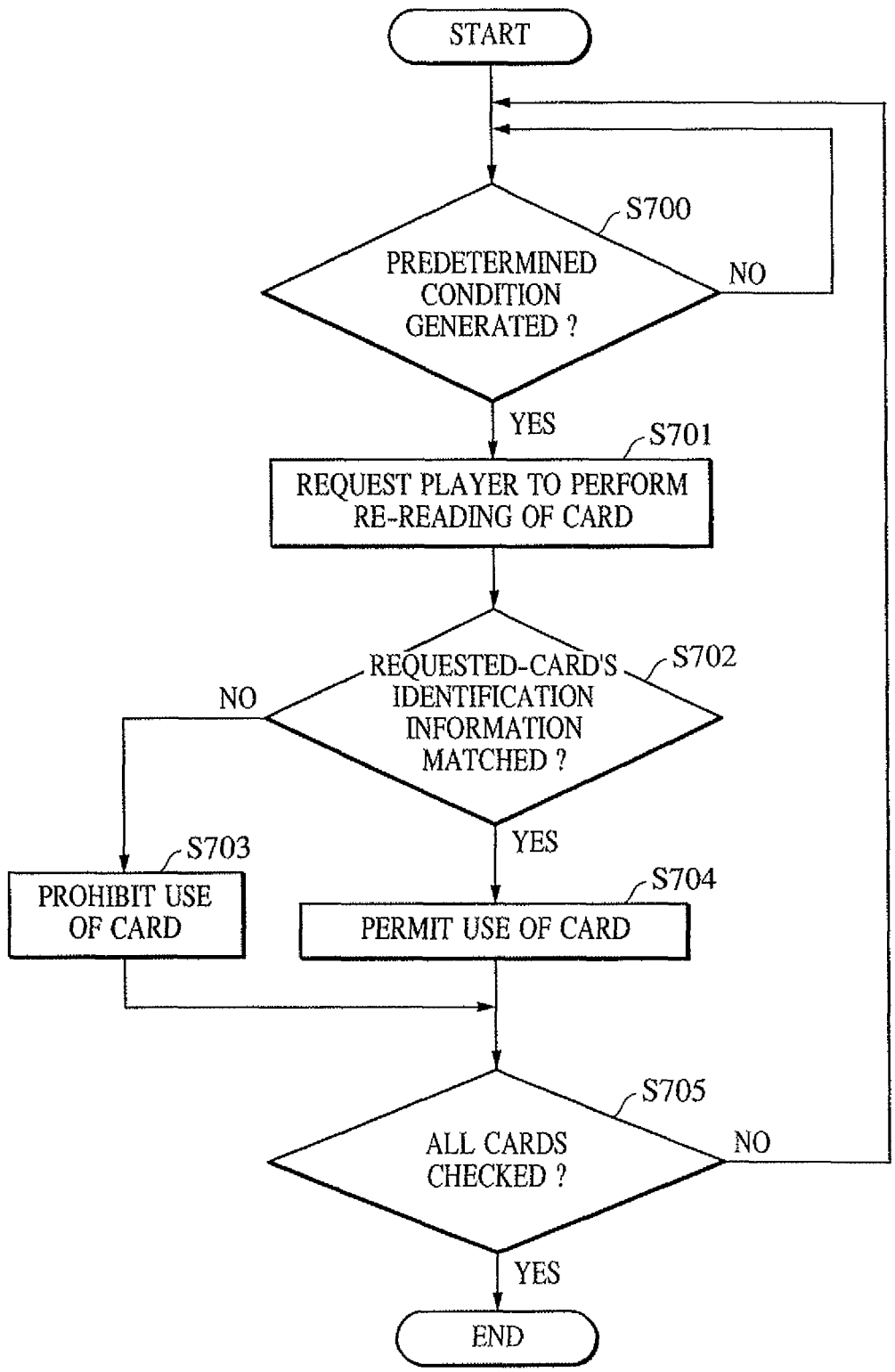
FIG. 13 is a flowchart showing a use-confirmation-3 process executed by the computer device 2 shown in FIG. 1.

FIG. 13 is a flowchart of a program (use confirmation-3 process) executed by the computer device 2.

Similarly to the programs shown in FIGS. 11 and 12, after a deck for each game player is created by executing each step in FIG. 5, the program is activated by the CPU 23 before the game is started or while the game is being played. The program in FIG. 13 does not need to be related to the program in FIG. 5. It can be applied to, for example, another type of game program that does not create a deck of cards, and may be independently executed.

In step S700, by referring to a card information table (table for managing the identification information of each card usable in the game program, card information corresponding to the identification information, and a predetermined re-reading condition for a case in which the card is a rare card) loaded beforehand in the RAM 22, the CPU 23 sequentially determines whether or not the predetermined condition is satisfied for each card of a deck list as shown in FIG. 7 or FIG. 8 from the top. If the CPU 23 has determined in step S700 that the predetermined condition is not satisfied, it permits the use of the rare card, and executes step S700 for the next rare card in the deck. For ordinary cards for which the predetermined condition is not set, the use confirmation-3 process is not used, and the ordinary cards are permitted to be used.

For example, when the predetermined condition is a permissible time that can elapse from a rare-card recording time or the previous re-reading time, in step S700, the CPU 23 determines, by referring a timer (not shown), whether or not a predetermined permissible time has elapsed from rare-card recording time or the previous re-reading time. The CPU 23 retains, in the RAM 22, the time of recording the identification information received in step 101 (in FIG. 5) of each rare card in a predetermined area (e.g., a recording area for player's deck) of the RAM 22, or the time of re-receiving (re-reading) identification information by the previous normal re-reading.

If the CPU 23 determines in step S700 that the predetermined permissible time has elapsed, in step S701, it requests the game player to perform re-reading of the rare card by using the display 1 or the display (not shown) of the controller 6. Conversely, if the CPU 23 determines in step S700 that the predetermined permissible time has not elapsed, it repeatedly performs step S700 for the next rare card.

In step S702, the CPU 23 receives identification information transmitted from the controller 6 (as a result of the re-reading), and determines whether or not the received identification information matches a rare card for which re-reading is requested. If the determination in step S702 is negative, the CPU 23 prohibits the use of the rare card in step S703, and executes step S705. Conversely, if the determination in step S702 is positive, the CPU 23 permits the use of the rare card in step S704, and executes step S705. In step S705, the CPU 23 determines whether it has confirmed all the rare cards of the deck list. If the CPU 23 has determined in step S705 that it has confirmed all the rare cards, it ends the use confirmation-3 process. If the CPU 23 has negatively determined in step S705, it repeatedly executes the process from step S700.

As described above, by retaining a rare-card recording time or a re-reading time, and requesting re-reading when a predetermined permissible time elapses from the time, inconvenience due to re-reading can be suppressed. For example, for a rare card (of which the rarity value is not so high) that does not need to be re-read, by setting the permissible time as a re-reading condition to, for example, a thousand years, the re-reading of the card is actually prohibited. This reduces the number of re-reading requests, thus enabling simplified construction. Also, this deletes the need for determination itself of whether re-reading is required, and simple comparison between the permissible time and the lapsed time is only used, so that program simplification can be implemented.

The above-predetermined condition is not limited to the above permissible time, but among rare cards recorded for requesting re-reading, a rare card requesting re-reading may be determined at random. Actual randomness is not always required (in many cases, randomness in the game may be generated by calculation). Randomness may be set in such a level that the game player cannot predict which rare card is next requested to be re-read. In this case, re-reading can be requested at random for rare cards constituting a deck.

In addition, in a case in which a game character corresponding to a rare card in which the predetermined condition is recorded is changed to a higher valued game character as a result of progress of the game, the rare card may be determined to be a card requesting re-reading. In this case, re-reading can be requested for the rare card in which the game character corresponding to the rare card is changed to the higher valued game character in the progress of the game. By using this technique, when a highly favorite and convenient game character is continuously used, a rare card as a basis is required. Thus, interaction between the rare card and the game character can be enhanced.

It may be determined that a rare card that has a large number of times it uses the predetermined condition in the game is a card requesting re-reading. In this case, re-reading can be requested for a rare card having a high frequency in use in the game.

By providing the operation of re-reading as a type of game, using a combination of the above predetermined conditions, physical and mental inconvenience of the operation can be reduced.

In the third embodiment, when the game player cannot comply with a re-reading request, in other words, when the identification information of a card requesting the re-reading request does not match the identification information of a re-read card, in step S502 in FIG. 11, in step S604 in FIG. 12, and in step S703 in FIG. 13, the use of the card is prohibited. To notify the game player of the prohibition, a message may be displayed on the display 1 or the display (not shown) of the controller 6, but the prohibition may be indicated for the game player by changing the state of the game character of the card which is displayed during the game to, for example, death, a faint, exhaustion, a chrysalis, an egg, hibernation, disappearance from home, or another state.

In the third embodiment, based on each predetermined condition, a re-reading request is generated for obtaining permission of continuous use. However, for further reducing stress caused by the progress of the game, it is more preferable to design the game so that the game player can perform re-reading on the player's initiative. Based on a predetermined condition, a game character corresponding to a card may be changed to be in a use-prohibited state, and re-reading of the card may change the state into a use-permitted state again. For example, when a game character corresponding to a card satisfies a predetermined condition (step S600 in FIG. 12, step S700 in FIG. 13), the state of the game character is automatically changed into, for example, death, a faint, exhaustion, a chrysalis, an egg, hibernation, disappearance from home, or another state, that is, the state is changed into a state in which the game character cannot be used unless the card is re-read. In this case, similarly to the above case, a combination of predetermined conditions can implement higher-level effects.

In addition, when the state of the game character is changed as a result of fighting into, for example, death, a faint, exhaustion, a chrysalis, an egg, hibernation, disappearance from home, or another state, the rare card can be prohibited from being used. By using this technique, psychological impressions on the change in the state of the game character can be enhanced, whereby unity of re-reading of the card and the progress of the game can be improved.

The present invention described in the third embodiment is applied to a computer device as a single device (a personal computer, a video game machine, a set-top box, etc.), and may further be applied to a system composed of a plurality of devices (e.g., a server and other computer devices that are connected by a network). For example, by enabling a plurality of game players to participate in the card game, the card game can be played with game players around the world.

By executing the programs (use confirmation-1, -2, and -3) shown in FIGS. 11, 12, and 13, by using the controller 6 (card reader) or by using a chief computer device to which computer devices 2 can connect, operations similar to those in the third embodiment can be implemented. For example, it is possible that a plurality of computer devices 2 be connected to the chief computer device (such as a personal computer, a video game machine, a set-top box, or a server). In this case, the computer devices 2 are linked to the chief computer device by wire, by radio, or by direct connection.

Each of the programs is stored in the ROM 31 of the card reader and is executed by the CPU 32. Also, each of the programs is stored in the memory of the chief computer device linked to each computer device 2 and is executed by a CPU (not shown). Each of the programs may be stored in a storage medium and may be provided in the storage medium to the computer device 2, the card reader 6, and the chief computer device.

As described above, one of the programs is used to execute by a computer device a card game in which a plurality of cards constitute the game. After using the identification information of a read card to record the card, re-reading is requested for confirming the use of the card. In one of the program, when the identification information of a card obtained by requesting re-reading does not match the previous identification information, the use of the card is prohibited. Conversely, when the identification information of a card obtained by requesting re-reading matches the previous identification information, the use of the card is permitted. The program notifies the game player of a re-reading request by displaying a message. The program notifies the game player of a re-reading request by changing the state of the game character. The program selects a card that requests re-reading, based on information set for each card. The program selects a card in which a predetermined time has elapsed from the time of recording the card, as a card to be re-read. The program selects a card of which the game character is changed to a higher valued game character during the game, as a card to be re-read.

Accordingly, after using the identification information of a read card to record the card, the computer device 2 that executes the card game in which a plurality of cards constitute the game can request re-reading for confirming the use of the card.

After using the identification information of a read card to record the card, the card reader 6 that is connected to the computer device 2 executing the card game using a plurality of cards can request re-reading for confirming the use of the card.

After using the identification information of a read card to record the card, the chief computer device to which a plurality of computer devices for executing card games each using a plurality of cards can request re-reading for confirming the use of the card.

Instead of the magnetic tape described in the second embodiment, an optically readable medium such as a barcode may be used for storage, and a memory chip may be used for electric storage. In particular, in order to store in a card its identification information and card information, the memory chip is preferable in storage capacity.

Although a fighting card game has been used to describe the third embodiment of the present invention, a card game using cards of sport players who play for a team may be used. For example, by arbitrarily combining the cards of team players in each sport to create a deck, the strongest team can be organized. For example, the number of cards in a deck corresponds to the number of persons in each sport team (9 players in baseball, 11 players in American football, 5 players in basket ball, 6 players in volleyball, 11 players for soccer, etc.).

As described above, according to the third embodiment, after the identification information of an externally read card is used to record the card, re-reading can be requested for confirming the use of the card. Therefore, a new type of game that is a complex of a card game and a video game can be provided.

In addition, according to the present invention, by recording a card after recording the card, the commercial value and rarity value of the card can be maintained, and interaction between the card and the game can create a unified game world.

Fourth Embodiment

In a fourth embodiment of the present invention, the structure of a card game system, as well as the block diagram of the card game system, the card, the common method for playing a card game, a game program (deck-creating process) executed by a computer device, and the control program executed by a controller are identical to those in the first embodiment. Accordingly, descriptions thereof are omitted.

Figure 14:
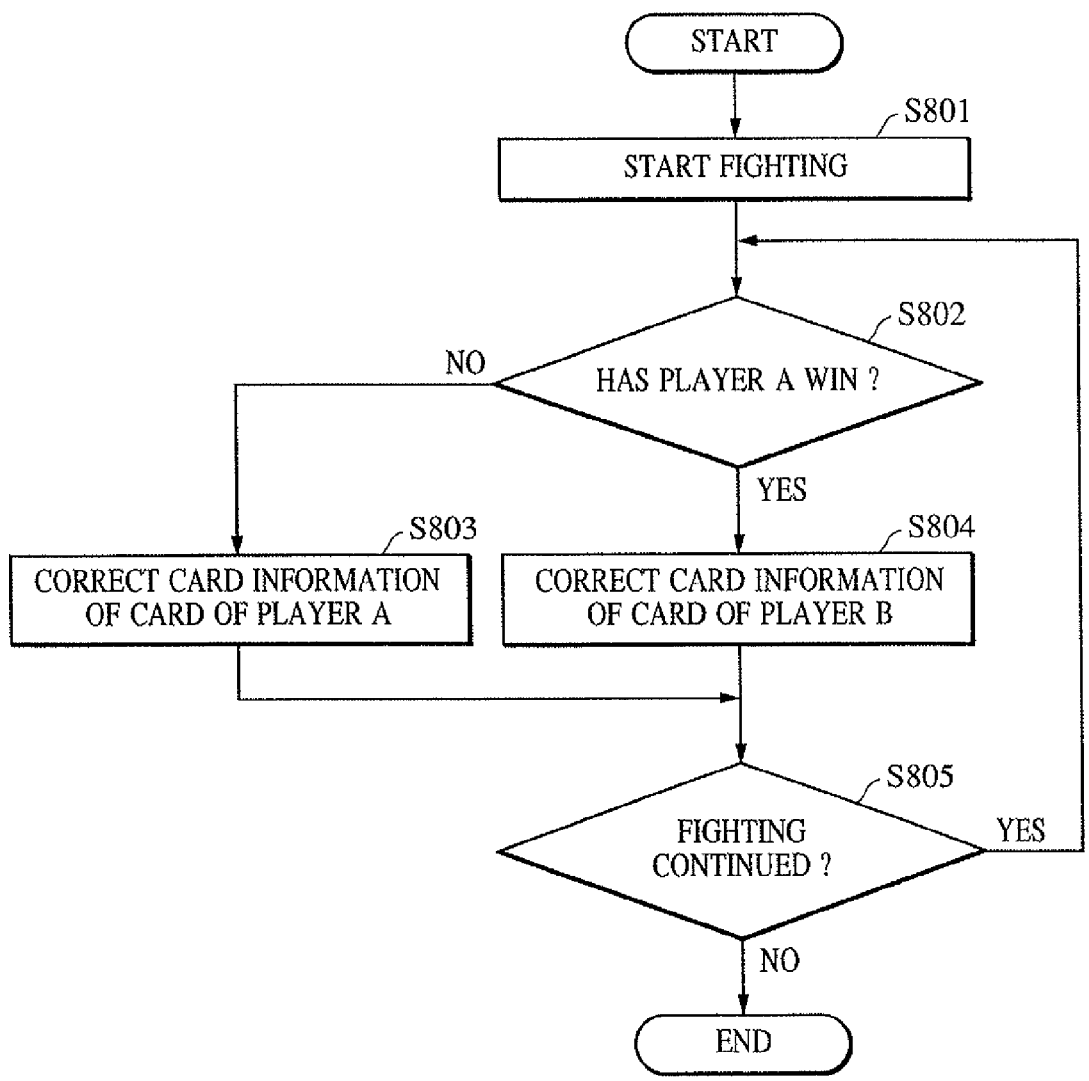
FIG. 14 is a flowchart showing a fighting flow executed by the computer device 2 shown in FIG. 1 and a portable computer device shown in FIG. 17.

After the deck is created by the process shown in FIG. 5, when the game player commands the start of card fighting, the program (fighting process) shown in FIG. 14 is executed by the CPU 23.

In step S801, the CPU 23 uses the display 1 or the display (not shown) of the controller 6 to inform the game player of the start of fighting, and lets the game player to start the fighting. In step S801, the CPU 23 determines whether a card of player A has defeated a card of player B. If player A has defeated player B, in step S804, the CPU 23 corrects card information corresponding to the identification information of the card of player B. Conversely, if player A has lost, in step S803, the CPU 23 corrects the card information of the card of player A. The result of the fighting in this case may be determined by total points calculated from the strength, offensive power, and defensive power in the card information of the card. The correction of the card information includes strength, offensive power, and defensive power decreases, and name and attribute changes in the card information of the loser's card. Also, in the card information of the winner's card, the strength, offensive power, and defensive power may be increase, and the name and attribute may be changed. Alternatively, by setting the strength, offensive power, and defensive power in the card information to be zero, the use of the card can be substantially prohibited. When the strength, offensive power, and defensive power in the card information are not zero, a use-permission flag is set, and the card may be used. In the card information, any one or a combination of the name, image, attribute, strength, offensive power, and defensive power of the game character of the card may be corrected. For example, by searching a memory for an image while referring to identification information, and correcting the image, for a card having increased or decreased fighting power, its game character is changed, so that unity of the card and the card game can be expanded.

In step S805, the CPU 23 determines whether to continue fighting. If it has determined to continue the fighting, it repeatedly executes the process from step S802. If it has determined not to continue the fighting, it ends the process.

As described above, after the identification information of a card read by the controller 6 is used to record the card, the card information of the card can be corrected in response to the result of the card fighting.

Figure 15:
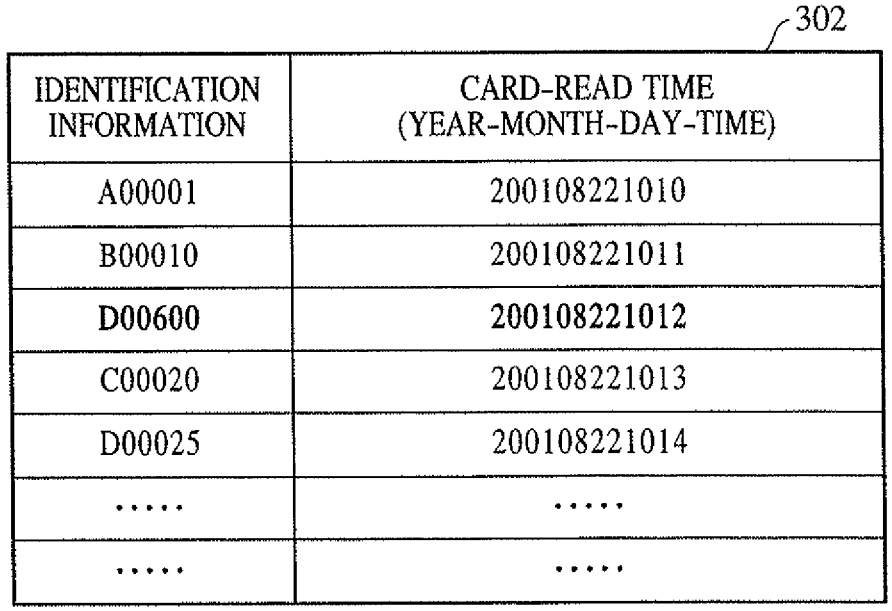
FIG. 15 is an illustration of a table of card-read times on cards in the deck of player A.

FIG. 15 shows a table 302 storing the card-read times of cards in the deck for player A. FIG. 16 shows a table 303 storing the card-read times of cards in the deck for player B.

Whenever the controller 6 is used to perform card reading, the CPU 32 of the controller 6 transmits the card-read time (year-month-day-time) and identification information of each read card to the computer device 2, and the CPU 23 of the computer device 2 creates the tables 302 and 303 in accordance with the deck creation.

With reference to the tables 302 and 303, the fourth embodiment is described below.

Although the first to third embodiments have described a case in which the card game is played in a single computer device 2 by player A and player B while they use their own cards, the fourth embodiment describes a case in which the card game is played in portable devices 50 and 60 that are connected to each other.

Figure 17:
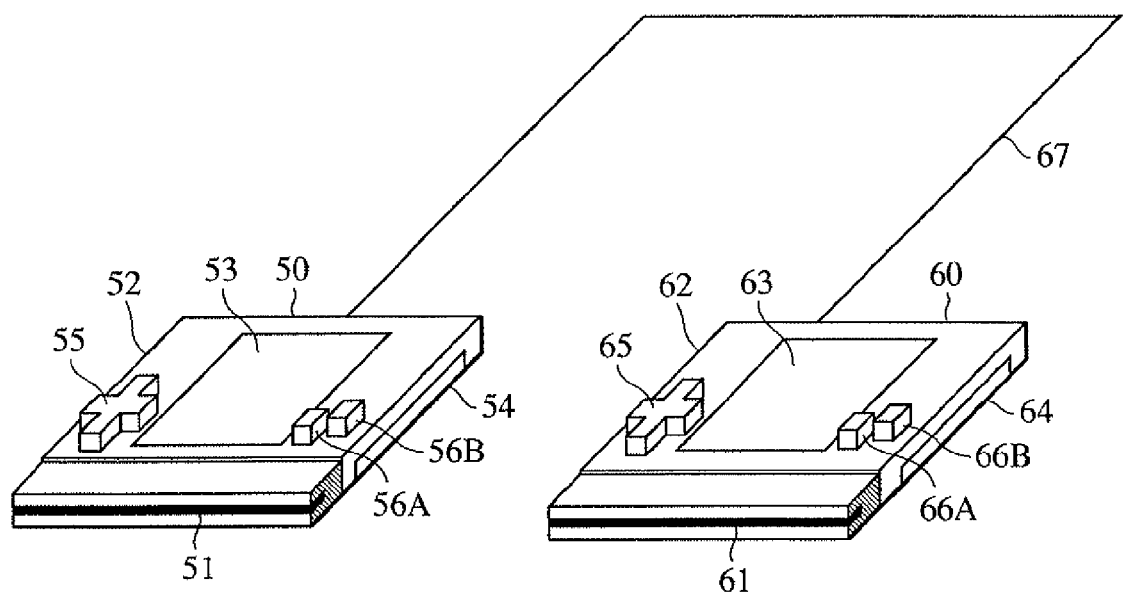
FIG. 17 is a perspective view showing a card game system using a plurality of portable computer devices.

FIG. 17 is a perspective view showing the configuration of a card game system according to the fourth embodiment.

A reader 51 reads magnetic or barcode information (identification information) on a card, and sends the information to a portable computer device 50. The portable computer device 50 has, on a side thereof, a display unit 53 for displaying game information, a game-cartridge slot 54 into which a game cartridge storing a game program is loaded, a direction-input button 55 for inputting directions such as upward and downward directions and right and left, a determination button 56A for designating determination or cancellation, and a cancel button 56B. The portable computer device 60 is identical in type to the portable computer device 50, and a reader 61 to a cancel button 66B respectively correspond to and are identical in function to the reader 51 to the cancel button 56B. The portable computer device 50 and the portable computer device 60 are connected by a connection cable 67 and perform bidirectional communication.

In the fourth embodiment, the portable computer device 50 using the game cartridge is connected to the portable computer device 60 by wire, that is, a connection cable 67. However, if the functions of the present invention are executed, unless otherwise noted, the present invention may be applied even when the portable computer device 50 or 60 is not portable, but is of the type of the computer device 2, which is of a desk-top type, and the display unit 53 is separate from the main unit, such as the display 1 or a television set. Similarly, a game storing medium is not limited to the game cartridge that is loaded into the game-cartridge slot 54, but may be a device built into the portable computer device 50 (not shown) or a device connected by a network such as a LAN or a WAN, such as a CD-ROM drive, a DVD drive, or a hard disk drive. The connection means between the portable computer device 50 and the portable computer device 60 is not limited to the connection cable 67 as a wire, but may be an infrared or wireless link. Also, the portable computer device 50 and the portable computer device 60 do not need to be directly connected, but may be connected via a plurality of devices.

Figure 18:
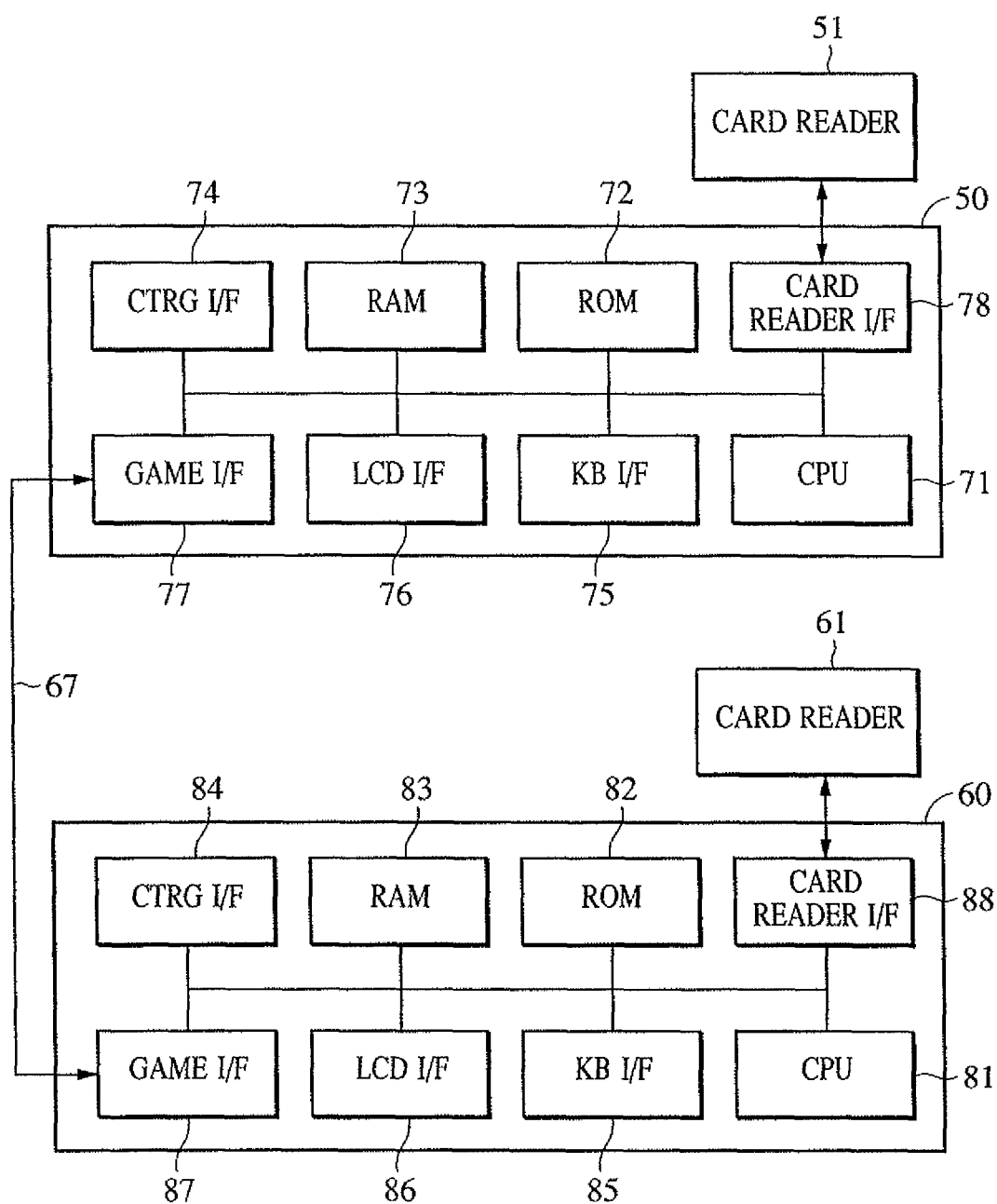
FIG. 18 is a block diagram showing the card game system shown in FIG. 17.

FIG. 18 is a block diagram of the card game system shown in FIG. 17.

Based on a game program (including the processes shown in FIGS. 5, 9, 19, and 20, card information, and a card output image, etc.) stored in a ROM 72, a CPU 71 controls the operation of the portable computer device 50. The game program can execute the deck creation and fighting described in the first embodiment since the game program includes the processes shown in FIGS. 5 and 9. Also, the game program uses a cartridge interface (indicated by "CTRG I/F" in FIG. 18) 74 to read a program stored in the game cartridge loaded into the cartridge slot 54, and controls the operation of the portable computer device 50 based on the read program. Alternatively, by temporarily loading the game program into a RAM 73, the game program in the RAM 73 may be executed. A keyboard interface (indicated by "KB I/F" in FIG. 18) 75 detects an input from the direction button 55, the determination button 56A, or the cancel button 56B, etc., of the computer device 50, and sends the input to the CPU 71. In accordance with the game program, a liquid crystal display interface (indicated by "LCD I/F" in FIG. 18) 76 displays, on the display unit 53, the information required for the progress of the game. A game interface 77 uses a wired or wireless connection means (the connection cable 67 in FIG. 18) to establish communication between the portable computer device 50 and the portable computer device 60, and is used to perform mutual transmission of deck lists and card-read-time tables. A card reader interface 78 connects to the card reader 51 and transfers card-read information (identification information, etc.) to the RAM 73.

The portable computer device 60 is identical in internal structure to the portable computer device 50 and identically functions. Accordingly, a description of each component is omitted.

Figure 19:
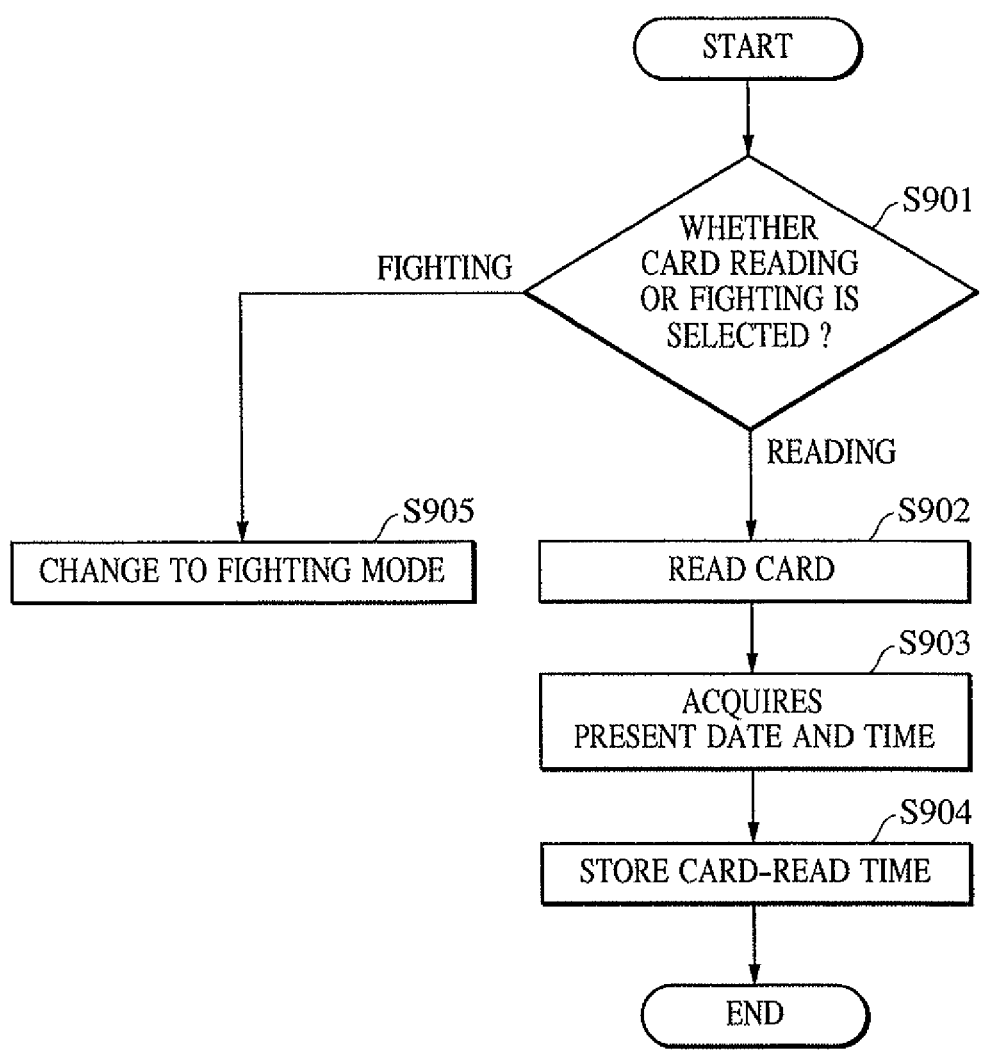
FIG. 19 is a flowchart showing a reading process executed by the portable computer device shown in FIG. 17.

FIG. 19 is a program (reading process) executed by the portable computer device 50.

The program is activated when player A turns on a power-supply switch (not shown) after loading the game cartridge into the cartridge 54 for the portable computer device 50. Simultaneously with the turning-on of the power-supply switch, the CPU 71 uses the cartridge interface 74 to read the program and activate the read program. The CPU 71 uses the liquid crystal display interface 76 to initialize the display unit 53 and initializes the game itself before starting the game.

Proceeding to step S901, the CPU 71 requests player A to select one of card reading and recording, and playing a fighting game using recorded cards. In step S901, if the CPU 71 has determined that player A has selected the word "Fight" displayed on the display unit 53, it proceeds to step S905 and activate a fighting mode. The fighting mode is described with reference to FIG. 20 from step S1001.

If the CPU 71 has determined in step S901 that player A has selected the words "Read Card" displayed on the display unit 53, it proceeds to step S902 and reads a card. When player A inserts a card into the reader 51, the identification information of the card is read and transmitted to the portable computer device 50. When the reading (transmission) ends, the CPU 71 proceeds to step S903. In step S903, the CPU 71 acquires the date and time it received the identification information, and stores the data and time as a card-read time in the RAM 73 in a form correlated to the identification information of the card. The CPU 71 acquires the present date and time by using a battery-operated internal clock (not shown) in the portable computer device 50, and stores the reception date and time the CPU 71 received the identification information, as a card-read time, in the RAM 73. However, another technique may be used for acquiring and storing the card-read time. In step S904, the card-read time in the RAM 73 is stored in a non-volatile memory (not shown) in the game cartridge by the CPU 71. By repeatedly executing steps S902 to S904 for necessary cards, the card-read-time tables shown in FIGS. 15 and 16 are finally created in the nonvolatile memory.

At this time, the card-read time may be also stored in another storage medium. When the storage of the card-read time ends, the CPU 71 ends the reading process. After step S904, the CPU 71 can create the deck by executing the process shown in FIG. 5.

Accordingly, by repeatedly executing steps S902 to S904 in FIG. 19, and executing the consecutive steps of the process shown in FIG. 5, the deck lists shown in FIGS. 7 and 8 can be recorded for each game player, and the card-read-time tables shown in FIGS. 15 and 16 can be created.

If it is not necessary to create a deck of cards, the CPU 71 may returns to step S901.

In any status of the process, by turning off the power-supply switch (not shown), the game is terminated. The described process is common to both the portable computer devices 50 and 60, and can be identically executed also by the portable computer device 60.

Figure 20:
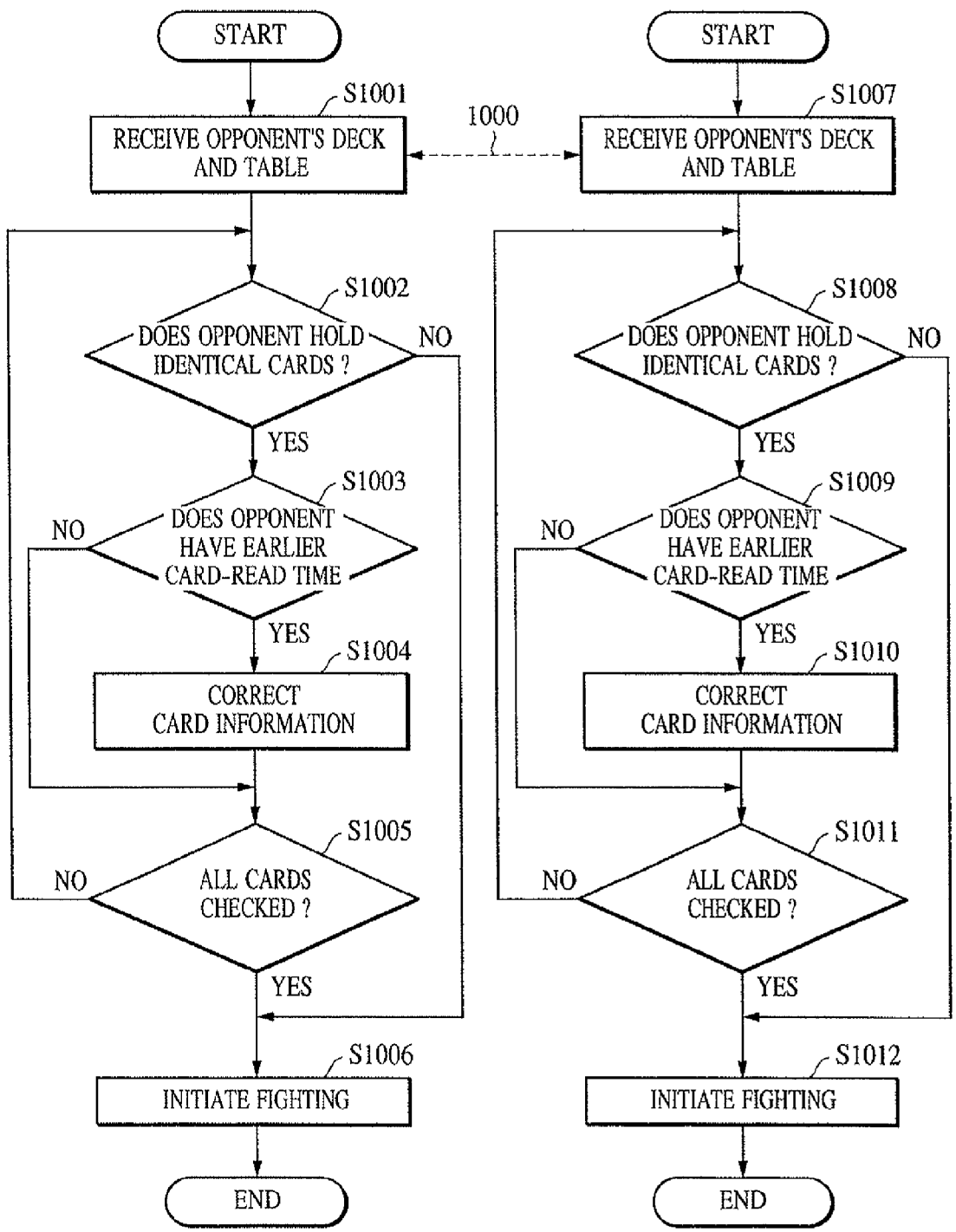
FIG. 20 is a flowchart showing a card-information correcting flow executed by the portable computer device shown in FIG. 17.

FIG. 20 is a flowchart showing programs (card-correcting processes) executed by the portable computer devices 50 and 60. Steps S1001 to S1006 are executed by the CPU 71 of the portable computer device 50, while steps S1007 to S1012 are executed by a CPU 81 of the portable computer device 60. Corresponding steps operate identically.

When the fighting mode is activated in step S905 in FIG. 19, in step S1001 (S1007), the connection cable 67 is used to acquire the deck list in FIG. 7 (FIG. 8) and the card-read-time table in FIG. 15 (FIG. 16) of the opponent. In step S1002 (S1008), the CPU 71 (81) determines whether or not a card of the player's card-read-time table is in the opponent's card-read-time table acquired by referring to identification information. When the card is not included, the CPU 71 (81) proceeds to step S1006 and can initiate fighting.

In step S1002 (S1008), if the CPU 71 (81) has determined that the player's card is included, it proceeds to step S1003 (S1009), and determines whether or not the card-read time of the player's card is earlier than that of the opponent's identical card by comparing both card-read-time tables. If the card-read time of the player's card is relatively (temporarily) earlier than that of the opponent's identical card, a right to use the card, and the CPU 71 (81) proceeds to step S1005 (S1011). For example, by comparing the card-read-time tables in FIGS. 15 and 16, the CPU 71 (81) determines that player A retains the card having the identification information "D00600" in common with player B, and determines that the card-read time "200108221012" of the card having "D00600" is earlier than the card-read time "200108221313" of the card of the player B. Accordingly, player A should obtain a right to use the card.

If the card-read time of the opponent's identical card is relatively (temporarily) earlier than the card-read time of the player's card, the CPU 71 (81) proceeds to step S1004 (S1010), and corrects the card information of the player's card before proceeding to step S1005. The correction of the card information includes decreases in the strength, offensive power, and defensive power of the card information, and name and attribute modifications. Conversely, the strength, offensive power, and defensive power of the card information may be increased, and the name and attribute may be changed. In addition, by setting the strength, offensive power, and defensive power of the card information to be zero, the use of the card can be prohibited.

In step S1005 (S1011), the CPU 71 (81) determines whether it has performed comparison of card-read times for all the cards in a deck the card-read times of which must be compared. If the CPU 71 (81) has not performed the comparison for all the cards, it proceeds back to step S1002. If the CPU 71 (81) has performed the comparison for all the cards, it proceeds to step S1006 (S1012).

In step S1006 (S1012), actual fighting using the cards is performed. The fighting reflects the fighting power of the card having the card information corrected in step S1004 (S1010). Decreased strength, offensive power, and defensive power of the card information decrease fighting power, while increased strength, offensive power, and defensive power of the card information increase fighting power. When the strength, offensive power, and defensive power of card information are corrected to zero (use-prohibition flag is set), the card having the card information is prohibited from being used. When the strength, offensive power, and defensive power of card information are not set to be zero, a use-permissible flag is set, the use of the card having the card information is permitted. The card information correction may be performed for any one or a combination of the name, image, attribute, strength, offensive power, and defensive power of the card's character. Also, by searching the memory for an image while referring to the identification information, and correcting the image, the image of the game character of a card having increased or decreased fighting power can be changed, thus expanding unity of cards and the card game. When the fighting ends, the card-correcting process ends.

When fighting is initiated, by executing the process in FIG. 14, card information can be further corrected in response to the result of fighting.

As described above, after using the card information of a card read by the card reader 51 or 61 to record the card, the card information of the card can be corrected based on the card-read time of the card.

Also, as described above, after using the card information of a card read by the card reader 51 or 61 to record the card, the card information of the card can be corrected based on the result of fighting in the game.

Therefore, by using the card information of a card to correct the card-read time of the card during the game, a type of value, the card-read time, can be generated. In particular, for a rare card, by adding the card-read time of the rare card as a value to the rare card, the card can have a new antique value and a new meaning.

A time in which the game is played, the number of times a key is pressed, the number of times saving/loading is performed, etc., can be used as the card-read time. In this case, it is preferable to confirm no simply continuous supply of power. For example, in a case in which a power-save mode is activated when a predetermined time has no input from a key, it is preferable that the time (the predetermined time) of the power-save mode be not included in the game time.

In addition, the above-predetermined condition must be set to be identical among a plurality of users. When a plurality of players perform fighting, portable computer devices of the players may have different clock frequencies. Accordingly, it is required that the present time and the card-read time be compared and the relative time difference between them be used. When the present time of portable computer device A is represented by T1A, the time a card is read by portable computer device A is represented by T2A, the present time of portable computer device B is represented by T1B, and the time a card is read by portable computer device B is represented by T2B, lapsed time ΔTA from card reading by portable computer device A is T2A-T1A, and lapsed time ΔTB from card reading by portable computer device B is T2B-T1B. Thus, by using difference in magnitude and relative time difference between ΔTA and ΔTB, the difference in present time can be cancelled. Also, by using the difference T1A-T1B in present time, or the like, of both portable computer devices, time condition can be identically set.

The relative time difference must be prevented from changing due to a change in the time of a portable computer device. Resetting of the time of a portable computer device changes a time difference between the card-read time and the present time. Accordingly, the difference must be corrected.

Also, when the time of a portable computer device is changed, a record of the change must be kept. When the time of the portable computer device is changed, by retaining the record, and making correction based on the card-read time, equity among game players can be maintained.

Alternatively, by performing processing based on a reference clock signal separate from the time of a portable computer device, effects caused by correction of the clock time of the portable computer device can be eliminated.

The card information of a read card can be changed or replaced based on a predetermined condition. When a plurality of portable computer devices are permitted to read identical cards, by setting the cards to have different contents, they can have rare card values, etc.

An initially read date and time can be used. For example, when a plurality of game players perform fighting after an initially read date and time is stored, a card having the initially read date and time may be used, and a card having a later read data and time is prohibited from being used. Alternatively, based on the card-read-time difference between both cards, any correction is made to them. In this way, it is important to acquire a card as early as possible. If an acquired and read card passes into others' hand, less trouble is generated. Also, when game players who do not know each other fight in an open match, at the moment the card-read times of their cards become clear, they have feeling of very high tension, so that pleasure of the game can be increased. When a game player who performs later reading of a card is set to be advantageous, the game player must continuously possess the card, so that the commercial value of the card can be enhanced. Without using a relative time difference, the present time may be separately created based on a lapsed time from the absolute card-read time by each portable computer device.

As described above, the program is used to execute the card game using a plurality of cards by a computer device. After using the identification information of a read card to record the card, the program corrects the card information of the card. The card information includes any of the name, image, attribute, strength, offensive power, and defensive power of a game character corresponding to identification information. The program changes the fighting power of the card by correcting the card information. The program also changes the image of the game character of the card by correcting the card information. The program corrects the card information of the card based on the result of playing the game. The program corrects the card information of the card based on its card-read time. The program compares the card-read times of identical cards of two game players, and corrects the card information of one card based on the result of the comparison.

Instead of the magnetic tape, an optically readable medium such as a barcode may be used for storage, and a memory chip may be used for electric storage. In particular, in order to store in a card its identification information and card information, the memory chip is preferable in storage capacity.

Although a fighting card game has been used to describe the fourth embodiment of the present invention, a card game using cards of players on sports teams may be used. For example, by arbitrarily combining the cards of team players in each sport to create a deck, the strongest team can be organized. For example, the number of cards in a deck may correspond to the number of players on a sports team (e.g., 9 players in baseball, 11 players in American football, 5 players in basket ball, 6 players in volleyball, 11 players for soccer, etc.).

As described above, in the fourth embodiment, after using the identification information of a read card to record the card, the card information of the card can be corrected.

Based on the result of playing the card game, the card information of a card can be corrected. Based on the card-read time of the card, the card information of the card can be corrected.

Accordingly, since the identification information of a read card is used to enable correction of the card information of the card, a new type of game that is a complex of a card game and a video game can be provided.

By correcting the card information of a card, the card can have a difference, whereby the commercial value of the card can be increased.

In addition, the object of the present invention can be achieved by using a storage medium storing a program code for implementing the functions of the above first to fourth embodiments, and controlling the computer (e.g., a CPU or an MPU) of a system or a device to read and execute the program code in the storage medium.

In this case, the program code itself read from the storage medium implements the functions of the first to fourth embodiments, and the storage medium storing the program code constitutes the present invention.

For example, a floppy disk, a hard disk, an optical disk, a magneto-optical disk, a CD-ROM, a CD-R, a CD-RW, a magnetic tape, a nonvolatile memory card, a ROM, a DVD-ROM, or a DVD-RAM, etc., can be used as the storage medium for providing the program code.

The present invention includes not only a case in which the functions of the first to fourth embodiments are implemented by executing the program code read by a computer device, but also a case in which an operating system activated in computer performs all or part of actual processes, based on instructions of the program code, and the processes implement the functions of the first to fourth embodiments.

Also, the present invention includes a case in which the program code read from the storage medium is written in a memory of an add-in board inserted into a computer device or an add-in unit connected to the computer device, and based on instructions of the program code, by performing all or part of actual processes in a CPU or the like of the add-in board or unit, the processes implement the functions of the first to fourth embodiments.

In addition, also a program code itself that is installed in a computer device in order to implement functional processing of the present invention realizes the present invention. In other words, the appended Claims of the present invention includes a computer program for implementing the functional processing of the present invention.

A method for providing the computer program is not limited to the above case in which the program is stored in a floppy disk or a CD-ROM, and is read and installed in a computer device, but by using a browser of a client computer to connect to a homepage on the Internet, and downloading from the homepage the program of the present invention or a file which is compressed and which has an automatic installation function, the program can be provided. Alternatively, by dividing the program code constituting the program of the present invention into a plurality of files, and downloading the files from different homepages, the provision can be implemented. In other words, also a WWW server from which the program files implementing by computer the functional processing of the present invention is associated with the present invention.

In addition, the present invention can be implemented by distributing to users a program of the present invention in a form in which the program is encrypted and stored in a storage medium such as a floppy disk, allowing each user who satisfies a predetermined condition to download key information from a homepage via the Internet, and using the key information to execute the encrypted program for installation in a computer device.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer device including one or more processors, the computer device for executing a game program using a plurality of cards to play a game, said computer device comprising:
   a first receiving unit configured to receive identification information read from a card in which the identification information is stored, the identification information specifying the card;
   a retrieving unit configured to retrieve card information corresponding to the identification information from a memory in which a plurality of the card information corresponding to a plurality of the identification information are pre stored;
   a game executing unit configured to execute the game program based on the card information retrieved by the retrieving unit;
   a registering unit configured to register a plurality of pieces of the identification information corresponding to the plurality of cards and received by the first receiving unit;
   a first display control unit configured to display all or part of the card information corresponding to a predetermined number of pieces of the identification information after receiving the predetermined number of pieces of the identification information by the first receiving unit;
   a requesting unit, implemented by using one or more processors, the requesting unit configured to request to read the identification information from the plurality of cards before starting the game program and to request to re-read the read identification information from the plurality of cards during the game program, the re-reading being performed after displaying the card information by the first display control unit;
   a determining unit, implemented by using one or more processors, the determining unit configured to determine whether or not the plurality of pieces of identification information re-read from the plurality of cards in response to a re-reading request during the game program correspond to the plurality of pieces of identification information registered by the registering unit; and
   a second display control unit, implemented by using one or more processors, the second display control unit configured to display information indicating that the card corresponding to the identification information, which is determined not to correspond by the determining unit, is changed to be in a use prohibited state in the game executing unit when the determining unit determines that the identification information does not correspond to the identification information registered by the registering unit.

2. The computer device according to claim 1, wherein the determination by the determination unit is repeatedly performed for each of the plurality of the cards in response to the request from the requesting unit.

3. The computer device according to claim 1, wherein the computer device informs a player of the requests from the requesting unit, by displaying a message.

4. The computer device according to claim 1, wherein the second display control unit displays information indicating that the card is changed to be in a use prohibited state, by changing a state of the card displayed during the game program.

5. The computer device according to claim 1, wherein the computer device informs the player of the request to re-read, by changing a state of a character of the card displayed during the game program.

6. The computer device according to claim 1, wherein the computer device selects a card to be requested to read and to re-read, by referring a memory storing information regarding whether each of the plurality of cards is to be requested to read and to re-read.

7. The computer device according to claim 1, wherein the computer device selects a card for which a predetermined time has passed since the identification information was registered, as a card to be requested to read and to re-read.

8. The computer device according to claim 1, wherein the computer device determines a value of the character of the card based on the identification information and progress of the game program, and selects a card that the character is changed to a high value character, as a card to be requested to read and to re-read.

9. The computer device according to claim 1, wherein the computer device selects a card used many times in the game program, as a card to be requested to read and to re-read.

10. The computer device according to claim 1, wherein the card stores the card information together with the identification information.

11. A method of executing a game program using a plurality of cards to play a game, said method comprising:
- a first receiving step of receiving identification information read from a card in which the identification information is stored, the identification information specifying the card;
- a retrieving step of retrieving card information corresponding to the identification information from a memory in which a plurality of the card information corresponding to a plurality of the identification information are pre stored;
- a game executing step of executing the game program based on the card information retrieved in the retrieving step;
- a registering step of registering a plurality of pieces of the identification information corresponding to the plurality of cards and received in the first receiving step;
- a first display step of displaying all or part of the card information corresponding to a predetermined number of pieces of the identification information after receiving the predetermined number of pieces of the identification information in the first receiving step;
- a requesting step of requesting, by using one or more processors, to read the identification information from the plurality of cards before starting the game program and of requesting to re-read the read identification information from the plurality of cards during the game program, the re-reading being performed after displaying the card information in the first display step;
- a determining step of determining, by using one or more processors, whether or not the plurality of pieces of identification information re-read from the plurality of cards in response to a re-reading request during the game program correspond to the plurality of pieces of identification information registered in the registering step; and
- a second display step of displaying, by using one or more processors, information indicating that the card corresponding to the identification information, which is determined not to correspond in the determining step, is changed to be in a use prohibited state in the game executing step when the determining step determines that the identification information does not correspond to the identification information registered in the registering step.

12. A non-transitory computer-readable medium storing a program, said program causing a computer which includes a processor to execute a method comprising:
- a first receiving step of receiving identification information read from a card in which the identification information is stored, the identification information specifying the card;
- a retrieving step of retrieving card information corresponding to the identification information from a memory in which a plurality of the card information corresponding to a plurality of the identification information are pre stored;
- a game executing step of executing the game program based on the card information retrieved in the retrieving step;
- a registering step of registering a plurality of pieces of the identification information corresponding to the plurality of cards and received in the first receiving step;
- a first display step of displaying all or part of the card information corresponding to a predetermined number of pieces of the identification information after receiving the predetermined number of pieces of the identification information in the first receiving step;
- a requesting step of requesting to read the identification information from the plurality of cards before starting the game program and of requesting to re-read the read identification information from the plurality of cards during the game program, the re-reading being performed after displaying the card information in the first display step;
- a determining step of determining whether or not the plurality of pieces of identification information re-read from the plurality of cards in response to a re-reading request during the game program correspond to the plurality of pieces of identification information registered in the registering step; and
- a second display step of displaying information indicating that the card corresponding to the identification information, which is determined not to correspond in the determining step, is changed to be in a use prohibited state in the game executing step when the determining step determines that the identification information does not correspond to the identification information registered in the registering step.

* * * * *